United States Patent
Ono et al.

(10) Patent No.: US 12,152,643 B2
(45) Date of Patent: Nov. 26, 2024

(54) CLUTCH CONTROL DEVICE

(71) Applicant: HONDA MOTOR CO., LTD., Tokyo (JP)

(72) Inventors: Junya Ono, Tokyo (JP); Tatsuya Ryuzaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/284,078

(22) PCT Filed: Mar. 8, 2022

(86) PCT No.: PCT/JP2022/010045
§ 371 (c)(1),
(2) Date: Sep. 26, 2023

(87) PCT Pub. No.: WO2022/209634
PCT Pub. Date: Oct. 6, 2022

(65) Prior Publication Data
US 2024/0167522 A1  May 23, 2024

(30) Foreign Application Priority Data
Mar. 31, 2021  (JP) ................................. 2021-062061

(51) Int. Cl.
*F16D 48/06* (2006.01)

(52) U.S. Cl.
CPC .... *F16D 48/068* (2013.01); *F16D 2500/1117* (2013.01); *F16D 2500/30401* (2013.01); *F16D 2500/50203* (2013.01)

(58) Field of Classification Search
CPC ........... F16D 48/068; F16D 2500/1117; F16D 2500/30401; F16D 2500/50203; F16D 48/06; F16D 2500/102; F16D 2500/302
See application file for complete search history.

(56) References Cited

U.S. PATENT DOCUMENTS

| | | | |
|---|---|---|---|
| 2008/0182720 A1* | 7/2008 | Kobayashi | F16D 48/068 477/175 |
| 2014/0090498 A1* | 4/2014 | Kojima | F16H 63/14 74/331 |

(Continued)

FOREIGN PATENT DOCUMENTS

| | | | | |
|---|---|---|---|---|
| DE | 112019003302 T5 * | 3/2021 | | F16D 48/06 |
| EP | 2713073 A1 * | 4/2014 | | F16D 48/06 |

(Continued)

OTHER PUBLICATIONS

International Search Report and Written Opinion for International Application No. PCT/JP2022/010045 mailed on May 24, 2022, 10 pages.

*Primary Examiner* — Tisha D Lewis
(74) *Attorney, Agent, or Firm* — Amin, Turocy & Watson, LLP

(57) ABSTRACT

A clutch control device includes a clutch apparatus (26) configured to connect and disconnect power transmission between a prime mover (13) and an output object (21), a clutch actuator (50) configured to output a driving force for actuating the clutch apparatus (26), a controller (40) configured to control driving of the clutch actuator (50), and a clutch operator configured to operate the clutch apparatus (26) regardless of the driving of the clutch actuator (50), the controller (40) detects that there is a manual operation by the clutch operator when a difference of a predetermined value or more is detected between a reference output value of the clutch actuator (50) configured to operate the clutch apparatus (26) and a measured value of an output value of the clutch actuator (50).

5 Claims, 18 Drawing Sheets

(56) References Cited

U.S. PATENT DOCUMENTS

2018/0283476 A1* 10/2018 Kojima .................. F16D 48/06
2020/0292015 A1   9/2020 Matsuda

FOREIGN PATENT DOCUMENTS

| JP | 2005-106246 | 4/2005 | | |
|----|-------------|--------|---|---|
| JP | 2005-249188 | 9/2005 | | |
| JP | 5004915 | 8/2012 | | |
| SE | 1550146 A1 * | 12/2015 | ............. | F16D 48/06 |
| WO | 2018/173671 | 9/2018 | | |

* cited by examiner

CLUTCH CONTROL DEVICE

TECHNICAL FIELD

The present invention relates to a clutch control device.

Priority is claimed on Japanese Patent Application No. 2021-062061, filed Mar. 31, 2021, the content of which is incorporated herein by reference.

BACKGROUND ART

In a saddle riding vehicle in recent years, an automatic clutch system in which a connecting/disconnecting operation of a clutch apparatus is automatically performed under electric control has been proposed (for example, see Patent Document 1)

CITATION LIST

Patent Document

[Patent Document 1]
Japanese Patent No. 5004915

SUMMARY OF INVENTION

Technical Problem

In the related art, a hydraulic pressure is supplied from a hydraulic actuator to a slave cylinder to disconnect a clutch apparatus. Control of the clutch apparatus is performed based on a value of a hydraulic pressure.

Incidentally, clutch control via a hydraulic pressure requires a hydraulic circuit including an actuator configured to generate a hydraulic pressure, resulting in a large increase in costs. Here, a configuration that directly operates a release mechanism with an electric motor without hydraulic pressure is being considered. In this case, it is also easy to intervene existing manual operations. Meanwhile, there is a demand for a configuration that can efficiently detect manual operations at arbitrary timings.

In consideration of the above-mentioned circumstances, the present invention is directed to providing a clutch control device configured to control connection and disconnection of a clutch apparatus, which can efficiently detect intervention of a manual operation at arbitrary timings.

Solution to Problem

As means for solving the above-mentioned problems, an aspect of the present invention is a clutch control device including: a clutch apparatus (26) configured to connect and disconnect power transmission between a prime mover (13) and an output object (21); a clutch actuator (50) configured to output a driving force for actuating the clutch apparatus (26); a controller (40) configured to control driving of the clutch actuator (50); and a clutch operator configured to operate the clutch apparatus (26) regardless of the driving of the clutch actuator (50), wherein the controller (40) detects that there has been a manual operation by the clutch operator when a difference of a predetermined value or more is detected between a reference output value of the clutch actuator (50) configured to operate the clutch apparatus (26) and a measured value of an output value of the clutch actuator (50).

In the above-mentioned aspect, the controller (40) may be shifted to predetermined manual operation intervention control when existence of the manual operation is detected.

According to the configuration, in the following cases, it can be determined that the manual operation intervention has occurred, and the manual operation intervention control can be performed. Such case is when the measured value of the current output value of the clutch actuator has a difference greater than or equal to the specified measured value with respect to the reference output value of the clutch actuator. The reference output value is the output value of the clutch actuator without manual operation intervention.

In this way, the following effects are exhibited by efficiently detecting the intervention of the manual operation at arbitrary timing. That is, the switching from the automatic clutch control to the manual intervention control can be realized at an arbitrary timing by a driver's operation.

In the above-mentioned aspect, when intervention of the manual operation is detected, the controller (40) may maintain an output value of the clutch actuator (50) upon the detection within those of a predetermined condition.

According to this configuration, the driver's discomfort caused by sudden disappearance of the output value of the clutch actuator during manual operation intervention can be suppressed. In addition, here, it is possible to shift to manual operation intervention control as appropriate.

In the above-mentioned aspect, when intervention of the manual operation is detected, the controller (40) may maintain the output value of the clutch actuator (50) upon the detection until a manual operation amount reaches a predetermined value and then gradually reduce the output value.

According to this configuration, the driver's discomfort caused by the sudden disappearance of the output value of the clutch actuator during the manual operation intervention can be suppressed. In addition, here, it is possible to suppress the power consumption due to the continuous output of the clutch actuator.

In the above-mentioned aspect, the controller (40) may maintain a clutch disconnection state within a predetermined condition when intervention of the manual operation is detected upon clutch disconnection by automatic control.

According to this configuration, when the manual operation intervention occurs during clutch disconnection by automatic control, the following effects are exhibited by maintaining the clutch disconnection state for a predetermined period. That is, it is possible to suppress an influence of a sudden clutch connecting operation after the manual operation.

Advantageous Effects of Invention

According to the present invention, in a clutch control device configured to control connection and disconnection of a clutch apparatus, intervention of a manual operation can be efficiently detected.

DESCRIPTION OF EMBODIMENTS

Figure 1:
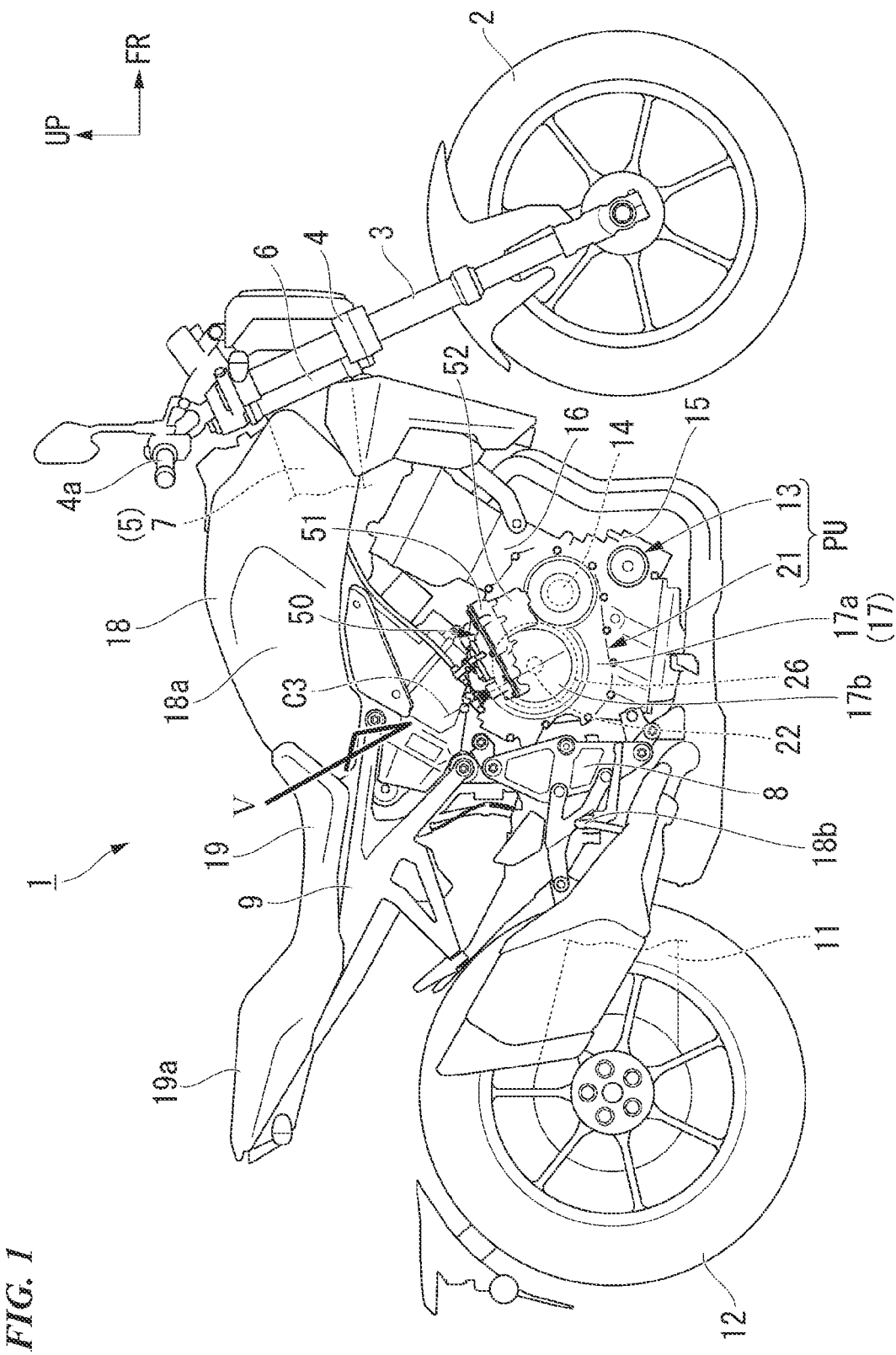
FIG. 1 is a right side view of a motorcycle of an embodiment.

Hereinafter, an embodiment of the present invention will be described with reference to the accompanying drawings. Further, directions of forward, rearward, leftward, rightward, and the like, in the following description are the same as directions in a vehicle described below unless the context indicates otherwise. In addition, at appropriate places in the drawings used in the following description, an arrow FR indicates the forward direction in the vehicle, an arrow LH indicates the leftward direction of the vehicle, and an arrow UP indicates the upward direction of the vehicle.

<Entire Vehicle>

As shown in FIG. 1, the embodiment is applied to a motorcycle 1 as an example of a saddle riding vehicle. A front wheel 2 of the motorcycle 1 is supported by lower end portions of a pair of left and right front forks 3. Upper portions of the left and right front forks 3 are supported by a head pipe 6 of a front end portion of a vehicle body frame 5 via a steering stem 4. A bar type steering handle 4a is attached onto a top bridge of the steering stem 4.

The vehicle body frame 5 includes the head pipe 6, main frames 7 extending downward and rearward from a center of the head pipe 6 in a vehicle width direction (leftward/rightward direction), pivot frames 8 provided below rear end portions of the main frames 7, and a seat frame 9 continuous with rear sides of the main frames 7 and the pivot frames 8. Front end portions of swing arms 11 are swingably axially supported by the pivot frames 8. A rear wheel 12 of the motorcycle 1 is supported by rear end portions of the swing arms 11.

A fuel tank 18 is supported above the left and right main frames 7. A front seat 19 and a rear seat 19a are supported above the seat frame 9 behind the fuel tank 18. Knee grip portions 18a recessed inward in a vehicle width direction are formed on both left and right sides of a rear portion of the fuel tank 18. The left and right knee grip portions 18a are formed to match the following areas. The areas are inner sides around left and right knees of a driver who sits on the front seat 19. Steps 18b are supported on both left and right sides below the front seat 19. The driver places feet in front of the ankles on the steps 18b.

A power unit PU including a prime mover of the motorcycle 1 is suspended below the main frames 7. The power unit PU integrally has an engine (internal combustion engine, prime mover) 13 located in the front thereof, and a gearbox 21 located in the rear thereof. The engine 13 is, for example, a multi-cylinder engine in which a rotary shaft of a crankshaft 14 is provided in a leftward/rightward direction (vehicle width direction).

The engine 13 has a cylinder 16 standing above a front portion of a crank case 15. A rear portion of the crank case 15 is a gearbox case 17 configured to accommodate the gearbox 21. A right cover 17a crossing a right side portion of the gearbox case 17 is attached to a right side portion of the crank case 15. The right cover 17a is a clutch cover configured to cover a clutch apparatus 26. The power unit PU is linked to the rear wheel 12 via, for example, a chain type transmission mechanism (not shown).

<Gearbox>

Figure 2:
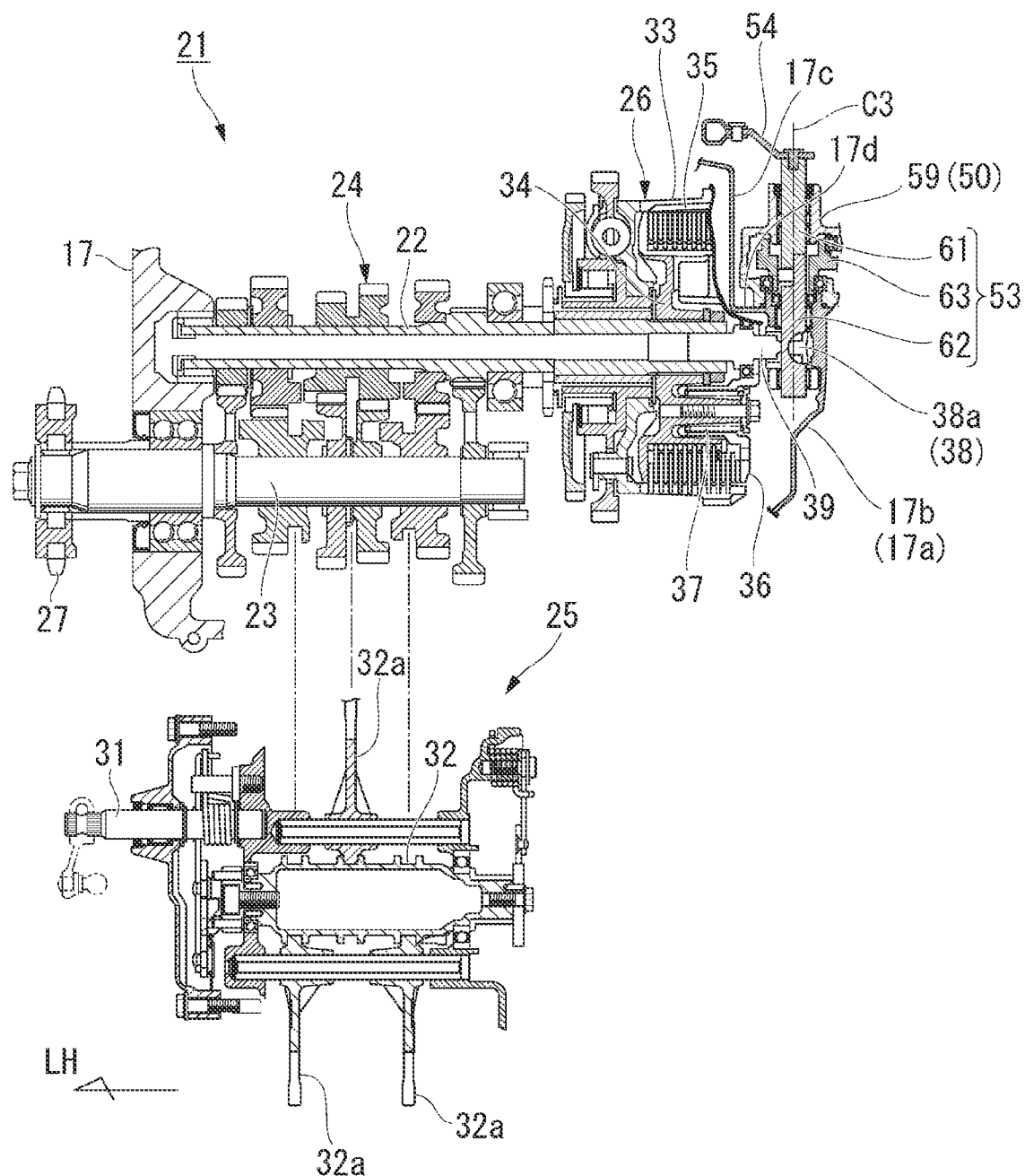
FIG. 2 is a cross-sectional view of a gearbox and a change mechanism of the motorcycle.

Referring also to FIG. 2, the gearbox 21 is a stepped transmission. The gearbox 21 has a main shaft 22 and a counter shaft 23, and a shifting gear group 24 that bridges between both the shafts 22 and 23. The counter shaft 23 constitutes an output shaft of the gearbox 21 and the power unit PU. A left end portion of the counter shaft 23 protrudes leftward from a rear portion of the gearbox case 17 and is connected to the rear wheel 12 via the chain type transmission mechanism.

The main shaft 22 and the counter shaft 23 of the gearbox 21 are disposed behind the crankshaft 14. The clutch apparatus 26 is disposed coaxially with a right end portion of the main shaft 22. The clutch apparatus 26 connects and disconnects power transmission between the crankshaft 14 of the engine 13 and the main shaft 22 of the gearbox 21. The clutch apparatus 26 performs the connection and disconnection using at least one of an operation of a clutch operator (for example, a clutch lever (not shown)) by an occupant or actuation of a clutch actuator 50, which will be described below.

The clutch apparatus 26 is, for example, a wet type multi-plate clutch, a so-called normally closed clutch. Rotary power of the crankshaft 14 is transmitted to the main shaft 22 via the clutch apparatus 26, and transmitted to the counter shaft 23 from the main shaft 22 via an arbitrary gear pair of the shifting gear group 24. A drive sprocket 27 of the chain type transmission mechanism is attached to a left end portion of the counter shaft 23 protruding leftward from a rear portion of the crank case 15.

A change mechanism 25 configured to switch a gear pair of the shifting gear group 24 is accommodated in the gearbox case 17 in the vicinity of the gearbox 21. The change mechanism 25 has a hollow cylindrical shift drum 32 parallel to both the shafts 22 and 23. The change mechanism 25 operates a plurality of shift forks 32a according to rotation of the shift drum 32. This operation is done according to a pattern of a lead groove formed in an outer circumference of the shift drum 32. According to this operation, the change mechanism 25 switches the gear pairs of the shifting gear group 24 used for power transmission between both the shafts 22 and 23.

Here, in the motorcycle 1, only a gear shifting operation (a foot operation of a shift pedal (not shown)) of the gearbox 21 is performed by a driver, and a connecting/disconnecting operation of the clutch apparatus 26 is automatically performed by electric control according to the operation of the shift pedal. That is, the motorcycle 1 employs a so-called semi-automatic gear shift system (automatic clutch type gear shift system).

<Gear Shift System>

Figure 3:
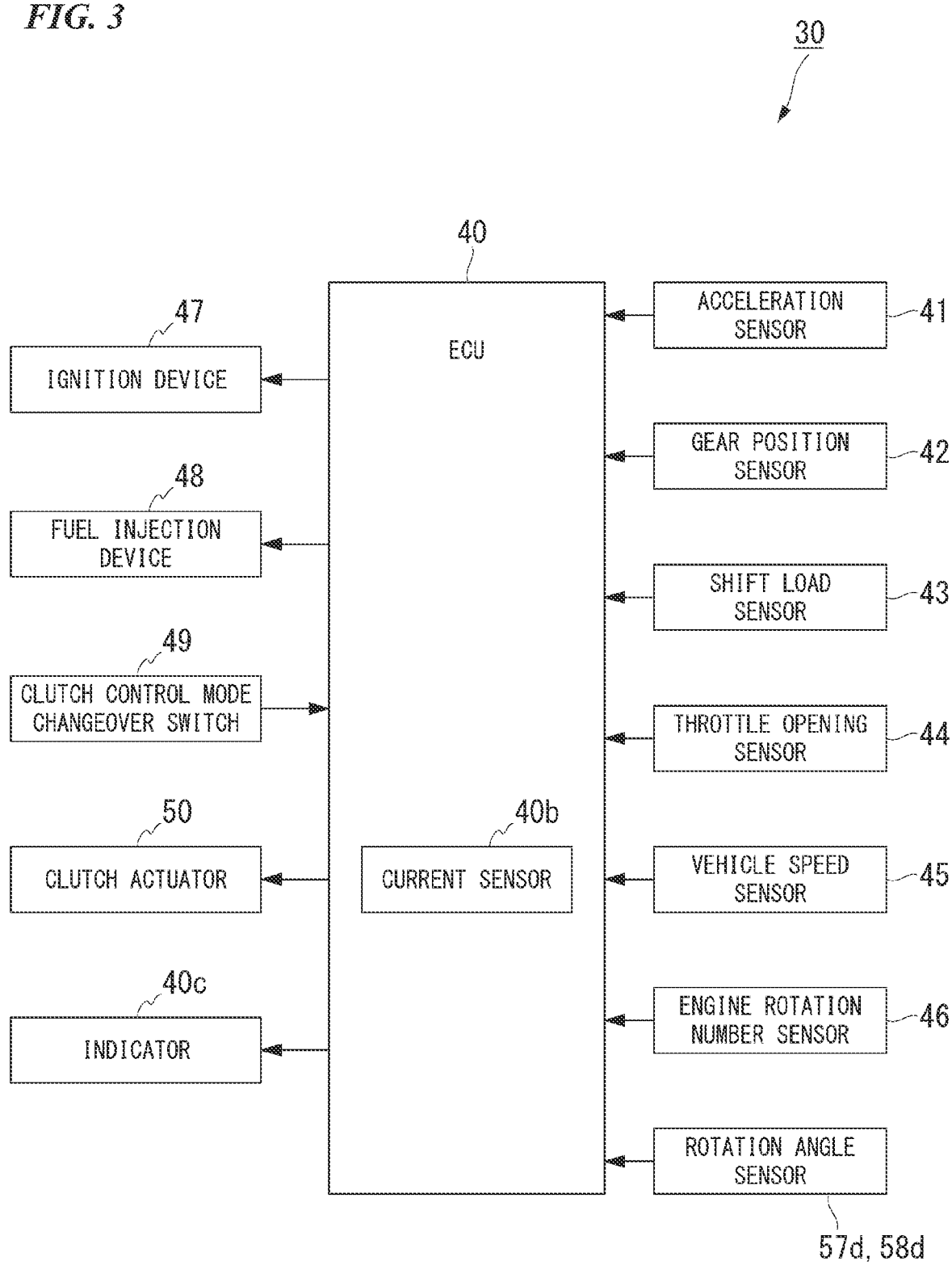
FIG. 3 is a block diagram of a gear shift system of the motorcycle.

As shown in FIG. 3, a gear shift system 30 includes the clutch actuator 50, an electronic control unit 40 (ECU, controller), various sensors 41 to 46, 57d and 58d, and various devices 47, 48 and 50.

The ECU 40 controls operations of the ignition device 47 and the fuel injection device 48, and controls an operation of the clutch actuator 50. This control is performed on the basis of detection information from the acceleration sensor 41, the gear position sensor 42, and the shift load sensor 43 (for example, a torque sensor), various types of vehicle state detection information from the throttle opening sensor 44, the vehicle speed sensor 45 and the engine rotation number sensor 46, and the like.

The acceleration sensor 41 detects a behavior of the vehicle body. The gear position sensor 42 detects a gear shifting stage from a rotation angle of the shift drum 32. The shift load sensor 43 detects an operation torque input to a shift spindle 31 (see FIG. 2) of the change mechanism 25. The throttle opening sensor 44 detects a throttle opening. The vehicle speed sensor 45 detects a vehicle speed. The engine rotation number sensor 46 detects an engine rotation number.

Figure 5:
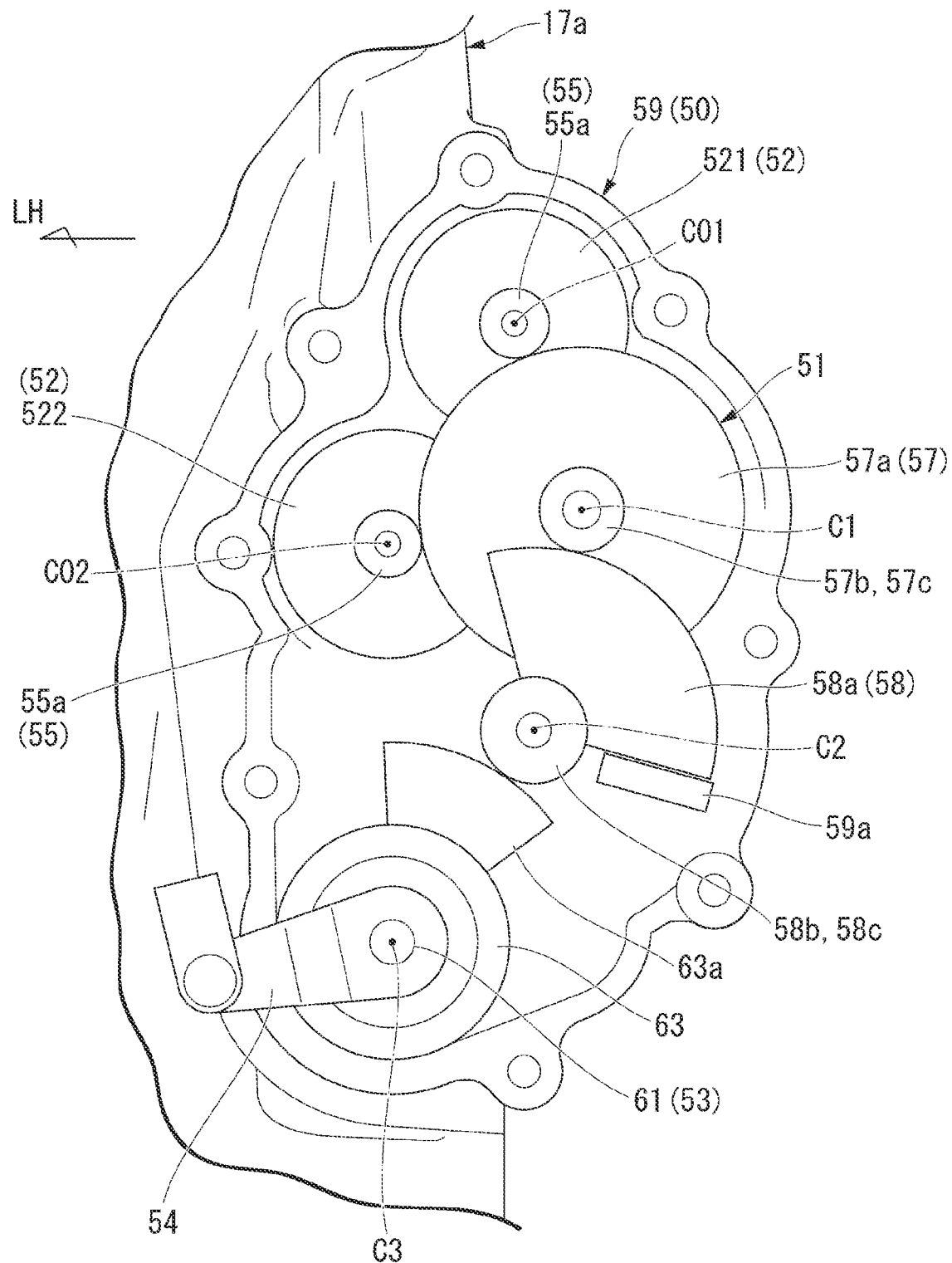
FIG. 5 is a view along an arrow V of FIG. 1, showing a clutch actuator in an axial direction.
Figure 6:
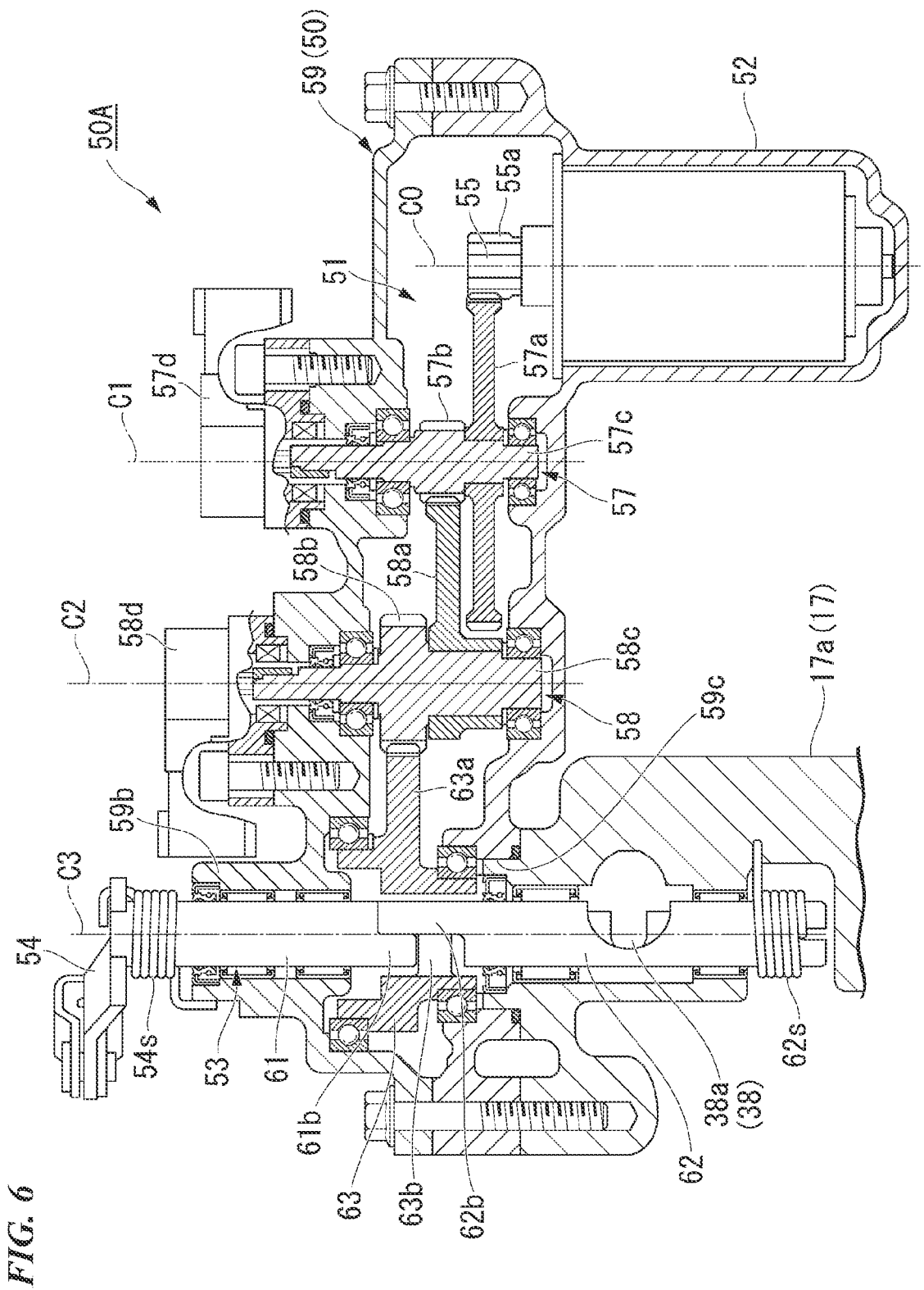
FIG. 6 is a deployed cross-sectional view of the clutch actuator in the axial direction.

Referring also to FIG. 5 and FIG. 6, the clutch actuator 50 controls a working torque applied to a release shaft 53 in order to connect and disconnect the clutch apparatus 26. The clutch actuator 50 includes an electric motor 52 (hereinafter, simply referred to as the motor 52) as a driving source, and a speed reducing mechanism 51 configured to transmit a driving force of the motor 52 to the release shaft 53. The speed reducing mechanism 51 includes a first reduction shaft 57 and a second reduction shaft 58. The first rotation angle sensor 57d and the second rotation angle sensor 58d configured to detect rotation angles are provided on the shafts 57 and 58, respectively.

The ECU 40 calculates the following current value on the basis of the previously set calculation program. The current value is a value of current supplied to the motor 52 in order to connect and disconnect the clutch apparatus 26. The current supplied to the motor 52 is obtained from correlation with the torque output to the motor 52. The target torque of the motor 52 is proportional to a working torque (a driven clutch lever torque, which will be described later) given to the release shaft 53. The value of the current supplied to the motor 52 is detected by a current sensor 40b included in the ECU 40. The operation of the clutch actuator 50 is controlled according to a change of the detected value. The clutch actuator 50 will be described below in detail.

<Clutch Apparatus>

Figure 11:
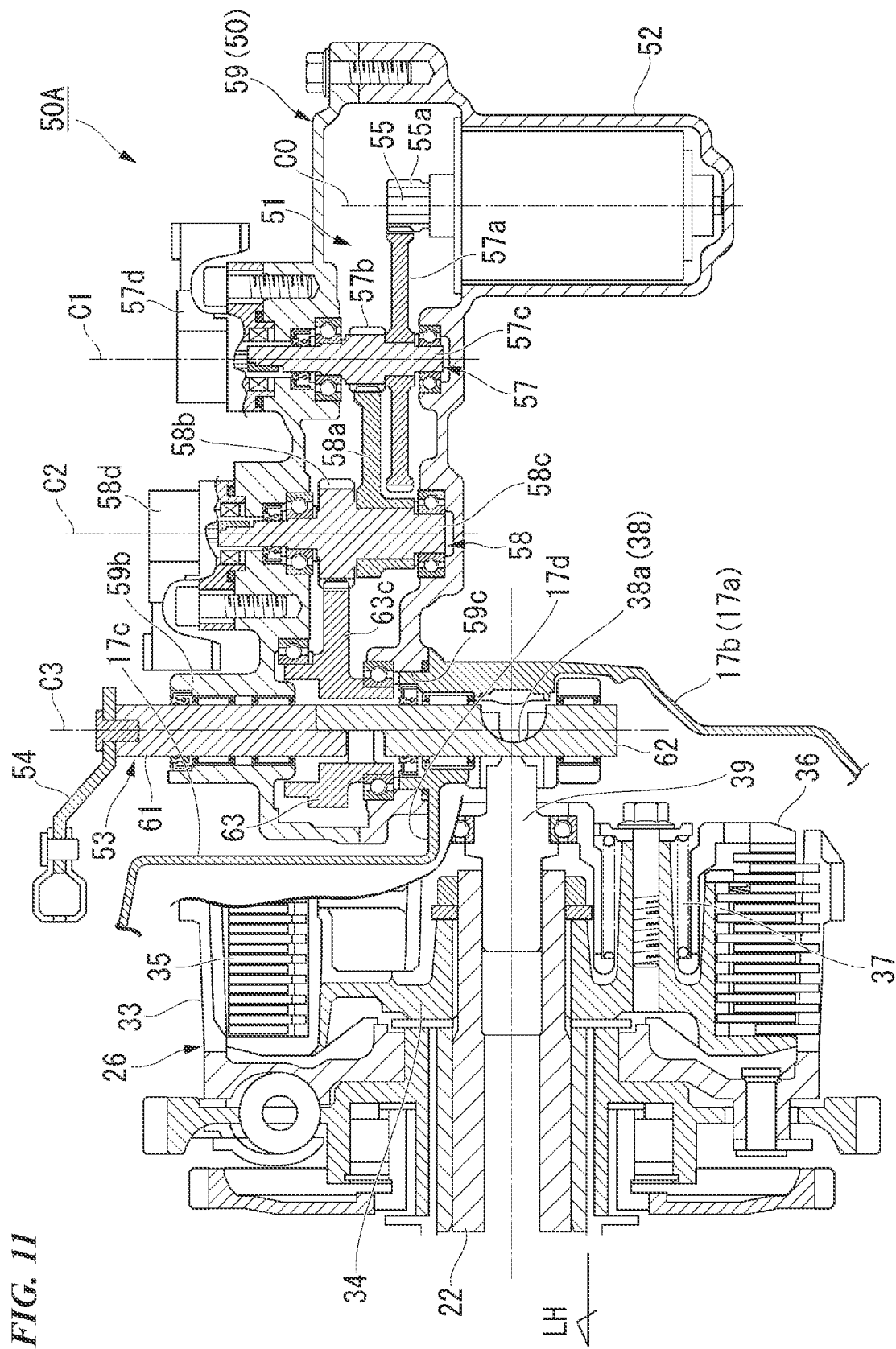
FIG. 11 is a cross-sectional view corresponding to FIG. 6 in a state in which the clutch actuator is attached to a right cover.

As shown in FIG. 2 and FIG. 11, the clutch apparatus 26 of the embodiment is a multi-plate clutch obtained by stacking a plurality of clutch plates 35 in an axial direction, and a wet type clutch disposed in an oil chamber in the right cover 17a. The clutch apparatus 26 includes an outer clutch 33, a center clutch 34, and the plurality of clutch plates 35.

The outer clutch 33 is driven by normally transmitting rotary power from the crankshaft 14. The center clutch 34 is disposed in the outer clutch 33 and supported by the main shaft 22 integrally rotatably. The plurality of clutch plates 35 are stacked between the outer clutch 33 and the center clutch 34 and frictionally engage them with each other.

A pressure plate 36 having substantially the same diameter as the clutch plates 35 is disposed on a right side of the stacked the clutch plates 35 (an outer side in the vehicle width direction). The pressure plate 36 receives an elastic load of a clutch spring 37 to be biased leftward, and pressure-welds (frictionally engages) the stacked clutch plates 35 with each other. Accordingly, the clutch apparatus 26 is in a connected state in which power transmission is possible. The clutch apparatus 26 is a normally closed clutch that becomes a connected state at normal times when there is no input from the outside.

Release of the pressure welding (frictional engagement) is achieved by an operation of a release mechanism 38 inside the right cover 17a. Actuation of the release mechanism 38 is achieved by at least one of an operation of a clutch lever (not shown) by an occupant and application of a torque by the clutch actuator 50.

<Release Mechanism>

As shown in FIG. 2 and FIG. 11, the release mechanism 38 includes a lifter shaft 39, and the release shaft 53.

The lifter shaft 39 is reciprocally held in a right side portion of the main shaft 22 in the axial direction. The release shaft 53 is disposed such that the lifter shaft 39 is perpendicular to the axial direction, and is held on an outer side portion of the right cover 17a to be rotatable around the axis.

Line C3 in the drawings indicates a center axis of the release shaft 53 extending in an upward/downward direction. The release shaft 53 is inclined rearward in the axial direction to be located rearward as it goes upward in a vertical direction when seen in the axial direction of the main shaft 22 (when seen in a side view of the vehicle) (see FIG. 1). The upper portion of the release shaft 53 protrudes outward from the right cover 17a, and a driven clutch lever 54 is integrally rotatably attached to an upper portion of the release shaft 53. The driven clutch lever 54 is connected to the clutch lever via an operation cable (not shown).

An eccentric cam portion 38a is provided on a lower portion of the release shaft 53 located inside the right cover 17a. The eccentric cam portion 38a is engaged with a right end portion of the lifter shaft 39. The release shaft 53 is pivoted around the axial center to move the lifter shaft 39 rightward using the action of the eccentric cam portion 38a. The lifter shaft 39 is configured reciprocally integrally with the pressure plate 36 of the clutch apparatus 26. Accordingly, when the lifter shaft 39 is moved rightward, the pressure plate 36 is moved rightward (lifted) against the biasing force of the clutch spring 37. Accordingly, frictional engagement between the stacked clutch plates 35 is released. Accordingly, the normally closed clutch apparatus 26 becomes a disconnected state in which power transmission is impossible.

Further, the release mechanism 38 is not limited to the eccentric cam mechanism and may include a rack and pinion, a feed screw, or the like. The mechanism configured to connect the clutch lever and the driven clutch lever 54 is not limited to the operation cable and may include a rod, a link, or the like.

<Clutch Control Mode>

Figure 4:
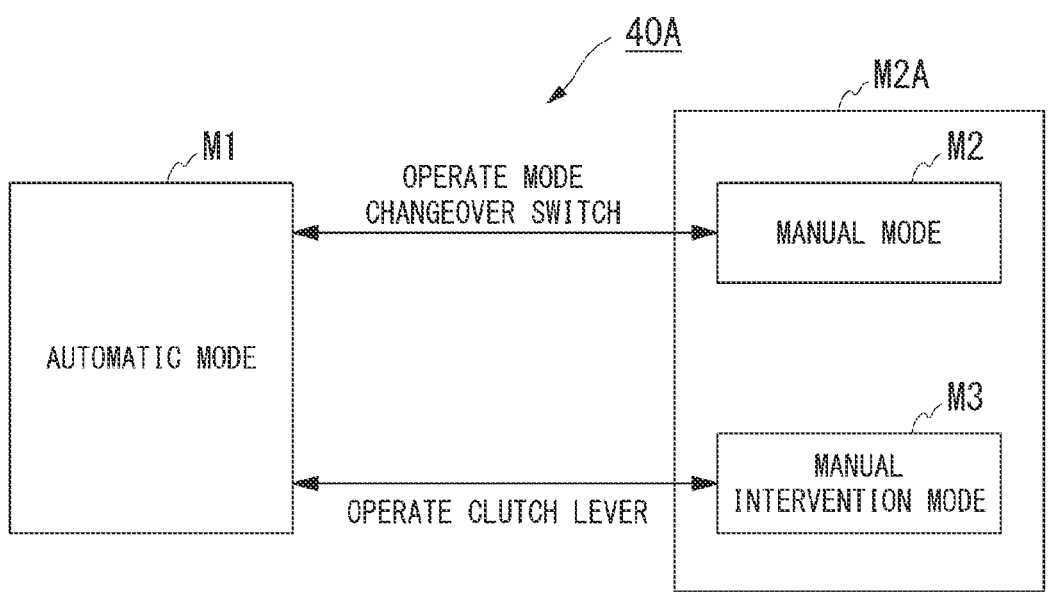
FIG. 4 is a view for describing transition to a clutch control mode of the motorcycle.

As shown in FIG. 4, a clutch control device 40A of the embodiment has three types of clutch control modes. The clutch control modes have an automatic mode M1 of performing automatic control, a manual mode M2 of performing a manual operation, and a manual intervention mode M3 of performing a temporary manual operation. The clutch control mode is appropriately transitioned between the three types of modes according to operations of a clutch control mode changeover switch 49 (see FIG. 3) and a clutch operator. Further, an object including the manual mode M2 and the manual intervention mode M3 is referred to as a manual system M2A.

The automatic mode M1 is a mode of calculating a clutch capacity appropriate for a traveling state and controlling the clutch apparatus 26 according to automatic departure/gear shifting control. The manual mode M2 is a mode of calculating a clutch capacity and controlling the clutch apparatus 26 according to a clutch operation instruction by an occupant. The manual intervention mode M3 is a mode of receiving a clutch operation instruction from an occupant during the automatic mode M1, calculating a clutch capacity from the clutch operation instruction and controlling the clutch apparatus 26, which is a temporary manual operation mode. Further, during the manual intervention mode M3, for example, when a state in which an occupant stops the operation of the clutch operator (a fully released state) is continued for a prescribed time, it may be set to return to the automatic mode M1.

For example, the clutch control device 40A starts control from the clutch on state (connected state) in the automatic mode M1 when the system starts. In addition, the clutch control device 40A is set to return to the clutch on in the automatic mode M1 when the engine 13 stops (when the system is off). In the normally closed clutch apparatus 26, when the clutch is on, there is no power supply to the motor 52 of the clutch actuator 50. Meanwhile, in the clutch off state (disconnect state) of the clutch apparatus 26, power supply to the motor 52 is maintained.

The automatic mode M1 is based on automatic clutch control. The automatic mode M1 allows the motorcycle 1 to travel without lever operation. In the automatic mode M1, the clutch capacity is controlled based on the throttle opening, the engine rotation number, the vehicle speed, the shift sensor output, and the like. Accordingly, it is possible to start the motorcycle 1 only with throttle operation without engine stall (or engine stop). In addition, the motorcycle 1 can be shifted only by a shift operation. In addition, in the automatic mode M1, when the occupant grips the clutch lever, it switches to the manual intervention mode M3. Accordingly, the clutch apparatus 26 can be arbitrarily disconnected.

Meanwhile, in the manual mode M2, by the lever operation by the occupant, it is possible to control the clutch capacity (that is, to enable connection/disconnection of the clutch apparatus 26). The automatic mode M1 and the manual mode M2 can be switched to each other. This switching is performed, for example, by operating the clutch control mode changeover switch 49 (see FIG. 3) while the motorcycle 1 is stopped and the gearbox 21 is in neutral. Further, the clutch control device 40A may include an indicator that indicates a manual state when transitioning to the manual system M2A (the manual mode M2 or the manual intervention mode M3).

The manual mode M2 is based on manual clutch control. The manual mode M2 can control the clutch capacity according to the operating angle of the clutch lever (and thus the operating angle of the driven clutch lever 54). Accordingly, it is possible to control the connection/disconnection of the clutch apparatus 26 according to the intention of the occupant. Further, even in the manual mode M2, when the shift operation is performed without clutch operation, the clutch control can be automatically intervened. Hereinafter, the operating angle of the driven clutch lever 54 is referred to as a driven clutch lever operating angle.

In the automatic mode M1, the connection/disconnection of the clutch apparatus 26 is automatically performed by the clutch actuator 50. Here, by performing the manual clutch operation on the clutch lever, it is possible to cause the automatic control of the clutch apparatus 26 to temporarily intervene the manual operation (the manual intervention mode M3).

<Manual Clutch Operation>

In the motorcycle 1 shown in FIG. 1, a clutch lever (not shown) as a clutch manual operator is attached to a base end side of a left grip of the steering handle 4a (an inner side in the vehicle width direction).

Referring also to FIG. 2, the clutch lever is connected to the driven clutch lever 54 attached to the release shaft 53 of the clutch apparatus 26 via an operation cable (not shown). The driven clutch lever 54 is integrally rotatably attached to the upper end portion of the release shaft 53 protruding from the upper portion of the right cover 17a.

In addition, for example, the clutch control mode changeover switch 49 is provided on a handle switch attached to the steering handle 4a. Accordingly, it is possible for the occupant to easily switch the clutch control mode during normal operation.

<Clutch Actuator>

As shown in FIG. 1, the clutch actuator 50 is attached to a rear upper portion of the right cover 17a of the crank case 15 on the right side.

Referring also to FIG. 5 and FIG. 6, the clutch actuator 50 includes the motor 52, and the speed reducing mechanism 51.

The motor 52 is, for example, a DC motor, and is disposed such that, for example, the release shaft 53 is parallel to the axial direction. The motor 52 is disposed such that a driving shaft 55 protrudes upward. The speed reducing mechanism 51 transmits a driving force of the motor 52 to the release shaft 53.

In the embodiment, a plurality of (two) motors 52 are provided in a single clutch actuator 50. Hereinafter, the motor 52 located in front of the clutch actuator 50 of the vehicle is referred to as a first motor 521, and the motor 52 located behind the first motor 521 of the vehicle and on an inner side in the vehicle width direction is referred to as a second motor 522. Lines C01 and C02 in the drawings indicate center axes (driving axes) of the motors 521 and 522, respectively. For convenience of description, both the motors 521 and 522 may be collectively referred to as the motor 52. In addition, both the axes C01 and C02 may be collectively referred to as an axis C0.

The speed reducing mechanism 51 reduces rotary power output from the motor 52 and transmits it to the release shaft 53. The speed reducing mechanism 51 includes, for example, a gear train in which the release shaft 53 is parallel to the axial direction. The speed reducing mechanism 51 includes driving gears 55a, a first reduction gear 57a, a first small diameter gear 57b, a second reduction gear 58a, a second small diameter gear 58b, a driven gear 63a, and a gear case 59.

The driving gears 55a is provided integrally with the driving shaft 55 of each of the motors 521 and 522. The first reduction gear 57a is meshed with each of the driving gears 55a. The first small diameter gear 57b is provided coaxially with the first reduction gear 57a. The second reduction gear 58a is meshed with first small diameter gear 57b. The second small diameter gear 58b is provided coaxially with the second reduction gear 58a. The driven gear 63a is meshed with the second small diameter gear 58b. The gear case 59 accommodates the gears.

The first reduction gear 57a and the first small diameter gear 57b are integrally rotatably supported by a first support shaft 57c. The first reduction gear 57a, the first small diameter gear 57b and the first support shaft 57c constitute the first reduction shaft 57. The second reduction gear 58a and the second small diameter gear 58b are integrally rotatably supported by a second support shaft 58c. The second reduction gear 58a, the second small diameter gear 58b and the second support shaft 58c constitute the second reduction shaft 58. Each of the first support shaft 57c and the second support shaft 58c is rotatably supported by the gear case 59. The second reduction gear 58a is a fan-shaped gear about the second support shaft 58c. The second reduction gear 58a is provided so as to extend forward and outward in the vehicle width direction of the second support shaft 58c. Line C1 in the drawings designates a center axis of the first reduction shaft 57, and Line C2 designates a center axis of the second reduction shaft 58.

The driven gear 63a is integrally rotatably provided on the release shaft 53. The driven gear 63a is a fan-shaped gear about the release shaft 53. The driven gear 63a is provided to extend forward from the release shaft 53. A gear of the speed reducing mechanism 51 on a downstream side has a small rotation angle. For example, the second reduction gear 58a and the driven gear 63a can be formed as fan-shaped gears with a small rotation angle.

As a result, the speed reducing mechanism 51 and the clutch actuator 50 can be reduced in size. That is, even when a large-diameter reduction gear is provided in order to increase the reduction ratio, the following effects can be obtained by cutting out portions other than the meshing range of the reduction gear to make it fan-shaped. That is, in particular, it is possible to suppress the speed reducing mechanism 51 from overhanging to the outer side in the vehicle width direction, and it is possible to reduce the weight of the speed reducing mechanism 51.

With such a configuration, the motor 52 and the release shaft 53 can always be interlocked via the speed reducing mechanism 51. Accordingly, a system is configured in which the clutch actuator 50 directly connects or disconnects the clutch apparatus 26.

Each gear is a flat spur gear with reduced thickness in the axial direction, and the gear case 59 is also formed in a flat shape with reduced thickness in the axial direction. Accordingly, the speed reducing mechanism 51 becomes less noticeable when seen in a side view of the vehicle. The first rotation angle sensor 57d and the second rotation angle sensor 58d are provided on the upper surface side of the gear case 59. The first rotation angle sensor 57d and the second rotation angle sensor 58d are connected to one end portions of the first reduction shaft 57 and the second reduction shaft 58, respectively, to detect their rotation angles.

The motor 52 is disposed to protrude downward from a front portion of the gear case 59. Accordingly, the motor 52 can be disposed as follows. That is, a bulging portion 17b of the right cover 17a that covers the clutch apparatus 26 can be disposed to avoid the front. For this reason, outward overhanging of the clutch actuator 50 in the vehicle width direction is suppressed.

The driving force of the motor 52 is reduced and transmitted to the release shaft 53 as follows. That is, the driving force of the motor 52 is reduced between the driving gears 55a and the first reduction gear 57a, reduced between the first small diameter gear 57b and the second reduction gear 58a, and further, reduced between the second small diameter gear 58b and the driven gear 63a.

In the embodiment, a stopper 59a is provided in front of a final stage (between the second small diameter gear 58b and the driven gear 63a) of the gear train of the speed reducing mechanism 51. The stopper 59a defines an initial position of the release shaft 53 (a stopping position in a returning direction opposite to a clutch disconnecting direction). The stopper 59a is formed integrally with, for example, the inner side of the gear case 59. The stopper 59a defines the stopping position of the second reduction gear 58a by contacting a side edge of the fan-shaped second reduction gear 58a. By providing the stopper 59a at a stage where the torque is smaller than the final stage of the speed reducing mechanism 51, the following effects are obtained. That is, while suppressing the strength of the gear case 59, the initial position of the release shaft 53 can be defined reliably. In addition, speed reduction can prevent excessive load input to the final stage where torque is maximized, and the gear can be reduced in size and weight.

<Disposition of Clutch Actuator>

Figure 15:
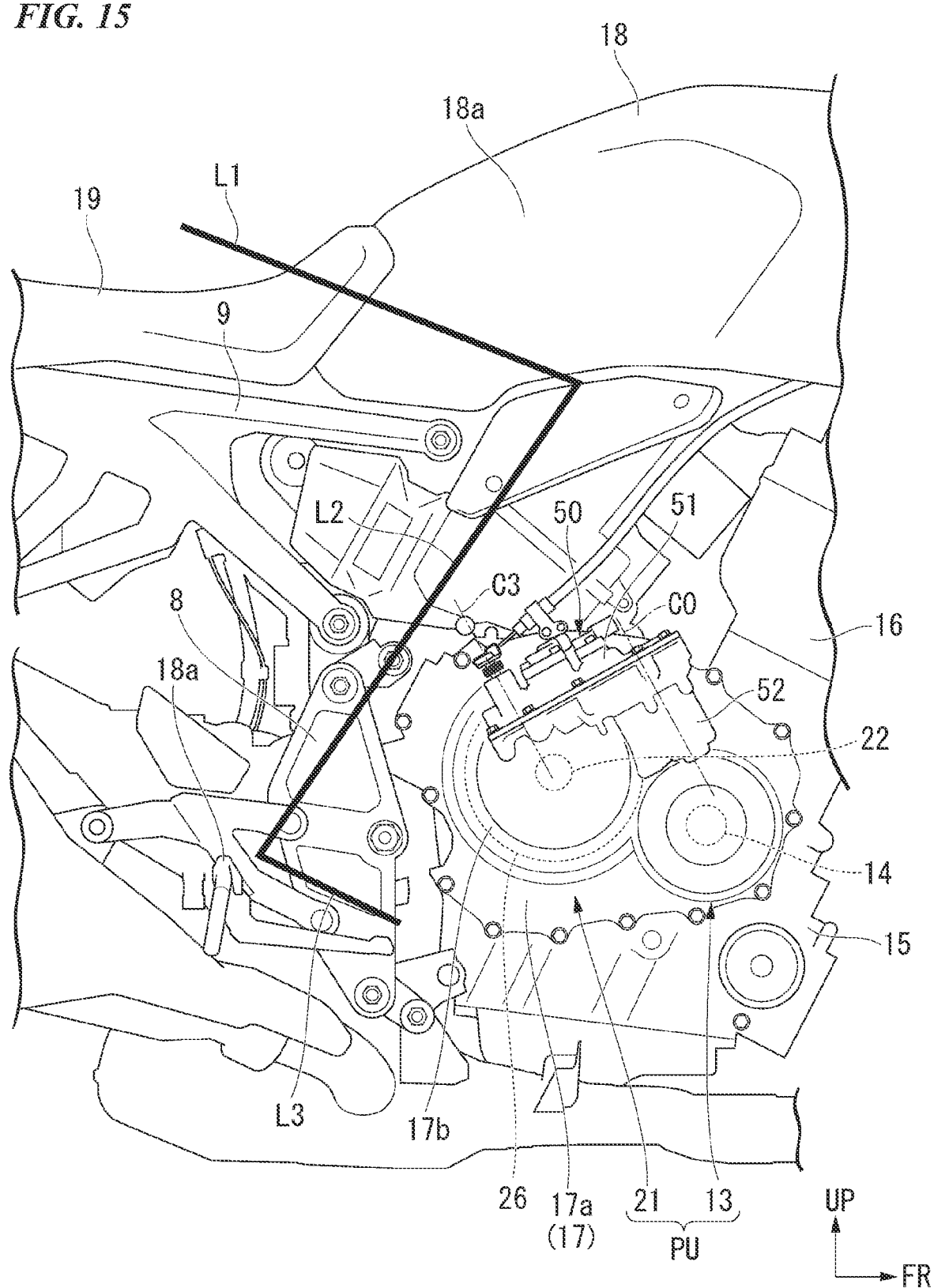
FIG. 15 is a right side view showing a main part of the motorcycle.
Figure 16:
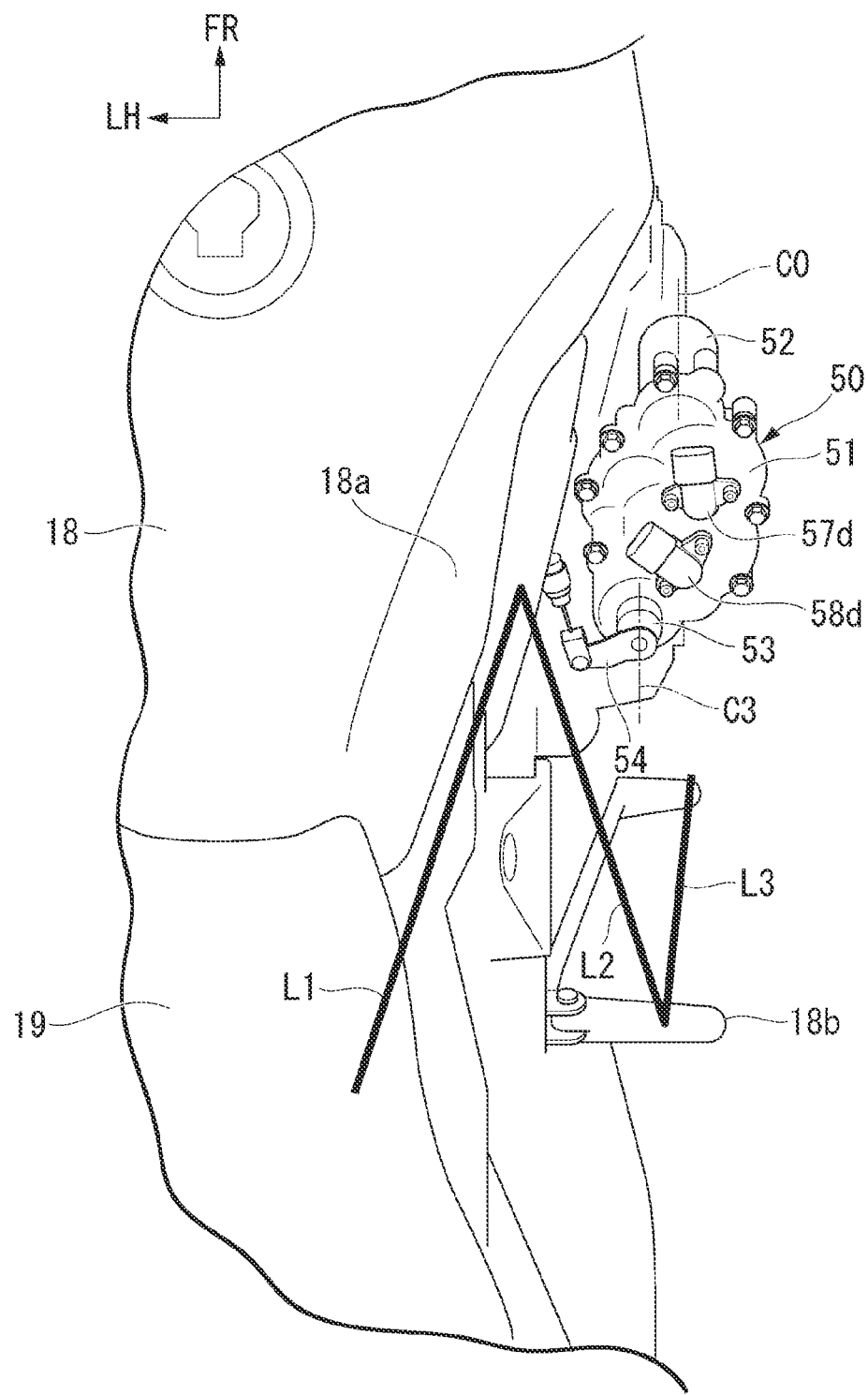
FIG. 16 is a plan view showing a main part of the motorcycle.
Figure 17:
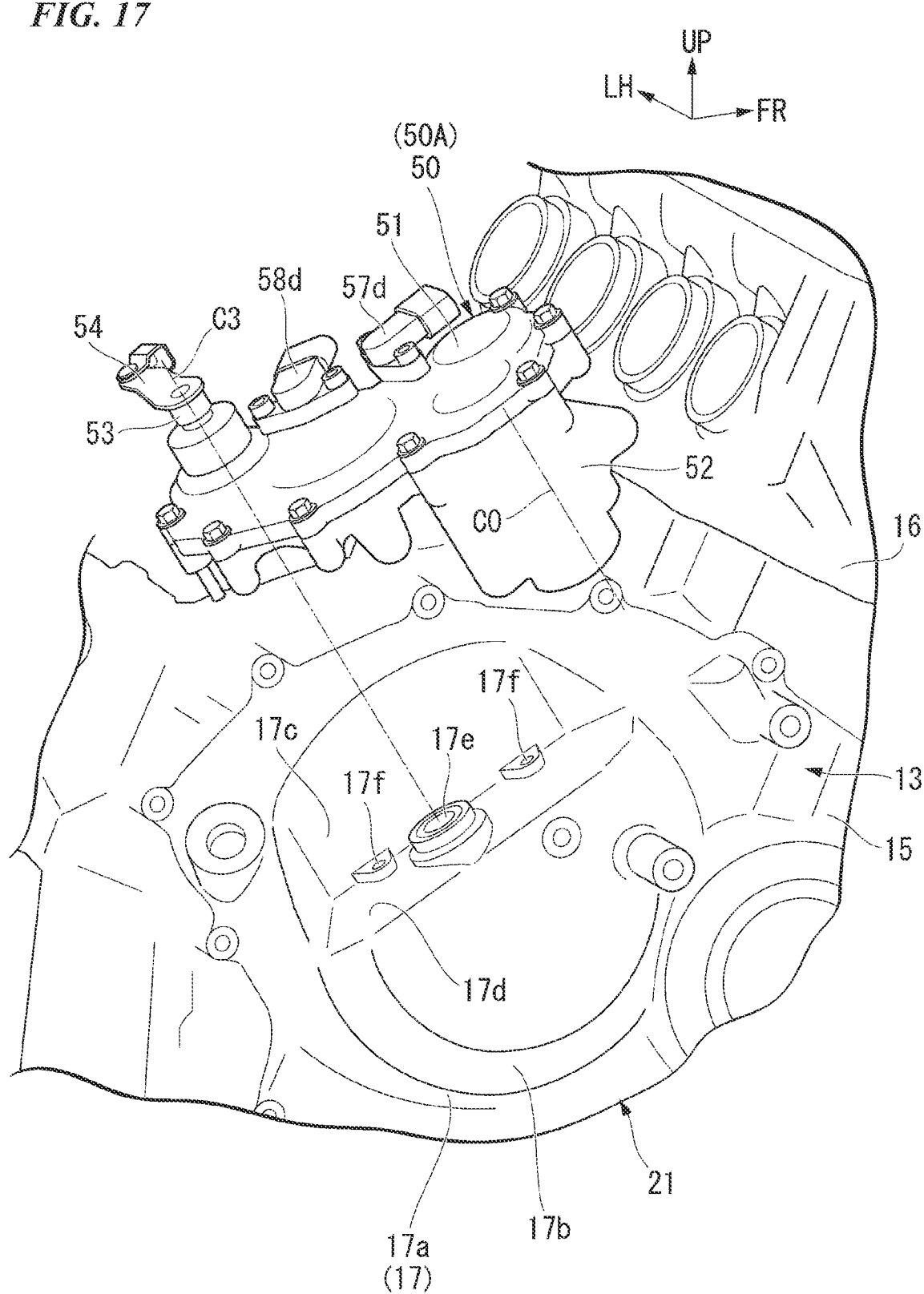
FIG. 17 is an exploded perspective view showing the main part of the motorcycle.

As shown in FIG. 15 to FIG. 17, the clutch actuator 50 is disposed vertically below the knee grip portions 18a on the right side of the fuel tank 18 when seen in a side view of the vehicle. The clutch actuator 50 is disposed to overhang outward in the vehicle width direction from the knee grip portions 18a on the right side of the fuel tank 18 when seen in a top view of the vehicle in FIG. 16. Line L1 in the drawings designates a femoral region of a driver's leg, Line L2 designates a lower leg from the knee, and Line L3 designates a foot from the ankle.

As for the leg of the driver, when seen in a side view of the vehicle, the lower leg L2 extends obliquely rearward and downward from the knee grip portion 18a and the foot L3 is placed on the step 18b. The clutch actuator 50 overhangs outward from the knee grip portions 18a in the vehicle width direction. The clutch actuator 50 is disposed so as to avoid the lower leg L2 of the driver's leg forward when seen in a side view of the vehicle. Accordingly, interference of the clutch actuator 50 with respect to the disposition space of the driver's leg is suppressed. The clutch actuator 50 is disposed so as to avoid the lower leg L2 of the driver's leg forward in the side view of the vehicle even when the driver extends the leg and lands the foot L3. In this respect as well, the interference of the clutch actuator 50 with respect to the disposition space of the driver's leg is suppressed.

Referring to FIG. 17, the right cover 17a defines the following range as the bulging portion 17b that bulges outward in the vehicle width direction. The range is a circular range coaxial with the clutch apparatus 26 when seen in a side view of the vehicle. A cover concave portion 17c is formed in the bulging portion 17b, which faces upward and rearward. The cover concave portion 17c changes the outer side surface inward in the vehicle width direction with respect to the remaining portion. The cover concave portion 17c is formed in a semicircular shape when seen in a side view of the vehicle.

A string portion of the cover concave portion 17c in the semicircular shape is formed in a linear shape perpendicular to the axial direction of the release shaft 53 when seen in a side view of the vehicle. The string portion forms a stepped portion 17d that changes an outer side surface of the bulging portion 17b in a stepped shape. The stepped portion 17d is inclined rearward and downward when seen in a side view of the vehicle. The upper portion of the release shaft 53 protrudes upward and rearward obliquely from the stepped portion 17d. The release shaft 53 passes through the stepped portion 17d of the cover concave portion 17c and protrudes outward from the cover. The clutch actuator 50 is attached to the right cover 17a while being disposed to enter the cover concave portion 17c.

<Release Shaft>

Figure 7:
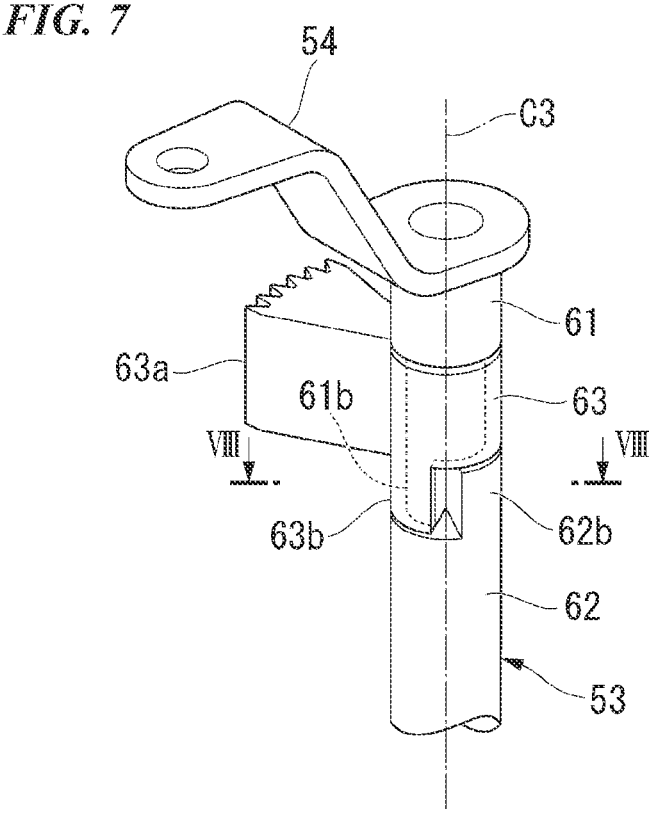
FIG. 7 is a perspective view of a release shaft configured to operate a clutch apparatus.
Figure 8:
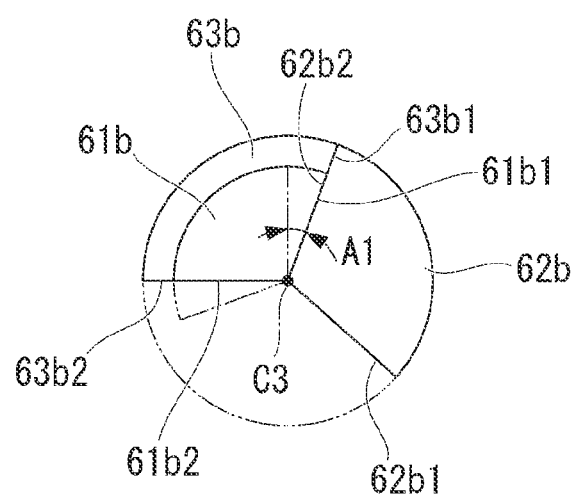
FIG. 8 is a cross-sectional view along line VIII-VIII in FIG. 7.

As shown in FIG. 6 to FIG. 8, the release shaft 53 is divided into a plurality of elements in order to be pivotable by individually receiving the input from the clutch actuator 50 and the input by the operation of the occupant.

The release shaft 53 includes an upper release shaft 61 that constitutes an upper portion, a lower release shaft 62 that constitutes a lower portion, and an intermediate release shaft 63. The intermediate release shaft 63 is disposed to bridge between the lower end portion of the upper release shaft 61 and the upper end portion of the lower release shaft 62.

The upper release shaft 61 is formed in a columnar shape. The upper release shaft 61 is rotatably supported by an upper boss portion 59b of the gear case 59. The upper release shaft 61 has an upper end portion protruding outward from the gear case 59. The driven clutch lever 54 is integrally rotatably supported by the upper end portion of the upper release shaft 61. A return spring 54s is attached to the driven clutch lever 54. The return spring 54s applies a biasing force in a direction opposite to pivoting by the operation of the clutch operator (pivoting in the clutch disconnecting direction) to the driven clutch lever 54.

The lower release shaft 62 is formed in a columnar shape. The lower release shaft 62 has a lower portion rotatably supported by an inner side of the right cover 17a. The lower portion of the lower release shaft 62 faces the inside of the gear case 59. The eccentric cam portion 38a of the release mechanism 38 is formed in the lower portion. A lower return spring 62s is attached to the lower end portion of the lower release shaft 62. The lower return spring 62s applies a biasing force in a direction opposite to the pivoting in the clutch disconnecting direction to the lower release shaft 62.

A manual operation-side cam 61b formed with a fan-shaped cross-section and extending in the axial direction is provided on a lower end portion of the upper release shaft 61.

A clutch-side cam 62b formed with a fan-shaped cross section and extending in the axial direction is provided on an upper end portion of the lower release shaft 62. The clutch-side cam 62b is provided within a range that avoids the manual operation-side cam 61b in the circumferential direction or the axial direction.

The lower end portion (the manual operation-side cam 61b) of the upper release shaft 61 and the upper end portion (the clutch-side cam 62b) of the lower release shaft 62 overlap each other in the axial direction while avoiding each other in the circumferential direction. Alternatively, the manual operation-side cam 61b and the clutch-side cam 62b overlap each other in the circumferential direction while avoiding each other in the axial direction. Accordingly, it is possible to press one side surface 61b1 of the manual operation-side cam 61b in the circumferential direction against the other side surface 62b2 of the clutch-side cam 62b in the circumferential direction and rotate the lower release shaft 62 (see FIG. 9B and FIG. 10B).

The other side surface 61b2 of the manual operation-side cam 61b in the circumferential direction and one side surface 62b1 of the clutch-side cam 62b in the circumferential direction are separated from each other in the circumferential direction or in the axial direction. Accordingly, when the clutch-side cam 62b has an input from the clutch actuator 50, the lower release shaft 62 can rotate independently from the upper release shaft 61 (see FIG. 9A and FIG. 10A).

The intermediate release shaft 63 is formed in a cylindrical shape. The intermediate release shaft 63 can be inserted through an engaging portion (upper and lower shaft engaging portions) between the lower end portion of the upper release shaft 61 and the upper end portion of the lower release shaft 62. The driven gear 63a is integrally rotatably supported by the intermediate release shaft 63.

A control operation-side cam 63b formed with a fan-shaped cross section and extending in the axial direction is provided on the intermediate release shaft 63.

The intermediate release shaft 63 and the driven gear 63a reduce contact with other components of the clutch actuator 50. Specifically, the intermediate release shaft 63, in addition to the bearing that supports the gear case 59, only contacts the inner circumferential portion of the following areas. These areas are the lower end portion (the manual operation-side cam 61b) of the upper release shaft 61 and the upper end portion (the clutch-side cam 62b) of the lower release shaft 62.

The control operation-side cam 63b of the intermediate release shaft 63 is engaged with clearance in the axial direction for the following portions. These portions are the manual operation-side cam 61b of the upper release shaft 61 and the clutch-side cam 62b of the lower release shaft 62.

In addition, the driven gear 63a only contacts the gear teeth with the second small diameter gear 58b. Accordingly, the friction of the driven gear 63a, which is the control gear, is reduced as much as possible, and the control accuracy of the release shaft 53 is improved.

The control operation-side cam 63b of the intermediate release shaft 63 and the clutch-side cam 62b of the lower release shaft 62 overlap each other in the axial direction while avoiding each other in the circumferential direction. Alternatively, the control operation-side cam 63b and the clutch-side cam 62b overlap each other in the circumferential direction while avoiding each other in the axial direction. Accordingly, it is possible to press one side surface 63b1 of the control operation-side cam 63b in the circumferential direction against the other side surface 62b2 of the clutch-side cam 62b in the circumferential direction and rotate the lower release shaft 62.

In addition, the control operation-side cam 63b is disposed to avoid the manual operation-side cam 61b of the upper release shaft 61 in the axial direction or the radial direction. Accordingly, when the input from the clutch actuator 50 is transmitted to the clutch-side cam 62b, the lower release shaft 62 can be rotated independently from the upper release shaft 61. In addition, when the manual operation is performed, the upper release shaft 61 can be rotated independently from the intermediate release shaft 63 on the control side.

The other side surface 63b2 of the control operation-side cam 63b in the circumferential direction and the one side surface 62b1 of the clutch-side cam 62b in the circumferential direction are separated from each other in the circumferential direction. Accordingly, when the clutch-side cam 62b has an input from a manual operation-side cam 63b, the lower release shaft 62 can be rotated independently from the intermediate release shaft 63.

Referring to FIG. 11 and FIG. 17, the clutch actuator 50 pivotably holds the upper release shaft 61 and the intermediate release shaft 63 with the gear case 59. The clutch actuator 50, including the upper release shaft 61 and the intermediate release shaft 63, constitutes an integrated actuator unit 50A.

The lower release shaft 62 is rotatably held by the right cover 17a. In the stepped portion 17d of the cover concave portion 17c of the right cover 17a, an opening portion 17e is provided and a fastening portion 17f of the gear case 59 is also provided. An upper end portion of the lower release shaft 62 protrudes from the opening portion 17e. An opening portion 59c is provided in a portion of the gear case 59 facing the stepped portion 17d of the cover concave portion 17c. The opening portion 59c allows the upper end portion of the lower release shaft 62 to face the inside of the gear case 59.

In such a configuration, when the actuator unit 50A is attached to the right cover 17a, the linear release shaft 53 is configured. The release shaft 53 is configured by connecting the upper release shaft 61, the intermediate release shaft 63 and the lower release shaft 62 to each other.

The power unit PU of the embodiment can be configured as follows for a manual clutch type power unit that performs the connecting/disconnecting operation of the clutch apparatus 26 by the operation of the driver without electric control. That is, the power unit PU can be configured by replacing the right cover 17a and the release shaft 53 and retrofitting the actuator unit 50A. For this reason, the actuator unit 50A can also be attached to power units of different models. For this reason, a semi-automatic gear shift system (automatic clutch type gear shift system) can be easily configured by sharing the actuator unit 50A among many models.

<Clutch Control>

Figure 12:
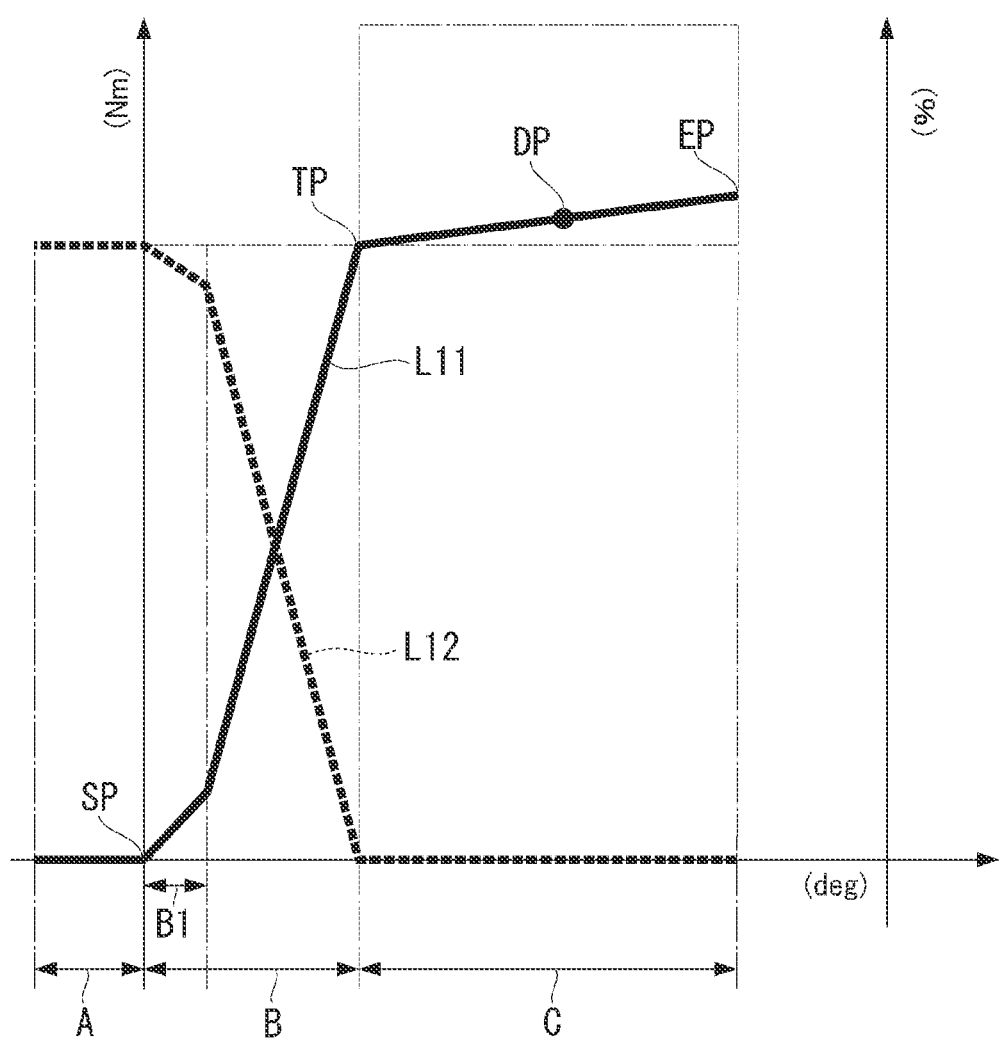
FIG. 12 is a graph showing properties of clutch control, a longitudinal axis indicating an output value of the clutch actuator, and a lateral axis indicates an operation quantity of a release mechanism.

Next, clutch control of the embodiment will be described with reference to a graph of FIG. 12. The graph of FIG. 12 shows clutch characteristics in the automatic mode M1. In the graph of FIG. 12, a longitudinal axis indicates a torque (Nm) applied to the driven clutch lever 54 and a clutch capacity (%), and a lateral axis indicates an operating angle (deg) of the driven clutch lever 54. The operating angle of the driven clutch lever 54 is an operating angle of the lower release shaft 62.

The torque of the driven clutch lever 54 is a torque generated by the lower release shaft 62. The torque corresponds to a torque value calculated by multiplying the following primary torque value by the reduction ratio of the speed reducing mechanism 51. The primary torque value is obtained based on a supplied current value to the motor 52 from the correlation between the supplied current to the motor 52 and the torque generated by the motor 52.

Hereinafter, the torque of the driven clutch lever 54 is referred to as a driven clutch lever torque. Correlation between the driven clutch lever operating angle and the driven clutch lever torque is shown by line L11 in the graph. Correlation between the driven clutch lever operating angle and the clutch capacity is shown by line L12 in the graph. Line L11 is a line showing an output value (reference output value) of the clutch actuator 50 when the clutch apparatus 26 is connected and disconnected in a state in which the manual operation is not intervened.

In the automatic mode M1 of the normally closed clutch, when the driven clutch lever torque (motor output) is "0," there is no operation input (input to the disconnection side) for the clutch apparatus 26, and clutch capacity is 100%. That is, the clutch apparatus 26 maintains a connected state. This state corresponds to a region A of the lateral axis of FIG. 12. The region A is a play region of the driven clutch lever 54. In the region A, there is no motor output, and the driven clutch lever torque stays at "0." In the region A, there is no operation of the clutch apparatus 26, and the clutch capacity stays at 100%.

Referring also to FIG. 8, in the region A, the one side surface 61b1 of the manual operation-side cam 61b of the release shaft 53 in the circumferential direction does not press the other side surface 62b2 of the clutch-side cam 62b in the circumferential direction. Here, the manual operation-side cam 61b is separated from the clutch-side cam 62b by the biasing force of the return spring 54s (shown by a dotted line in FIG. 8). In the region A, the driven clutch lever 54 is in a play state in which the manual operation-side cam 61b can move toward and away from the clutch-side cam 62b by an angle A1 in the drawings. For example, in the region A, the one side surface 63b1 of the control operation-side cam 63b in the circumferential direction abuts the other side surface 62b2 of the clutch-side cam 62b in the circumferential direction.

Referring to FIG. 12, when the driven clutch lever operating angle is increased to pass the play region A, the driven clutch lever operating angle shifts to a half clutch region B. In the half clutch region B, due to the operation of the motor 52, the driven clutch lever torque starts to increase.

Figure 9A:
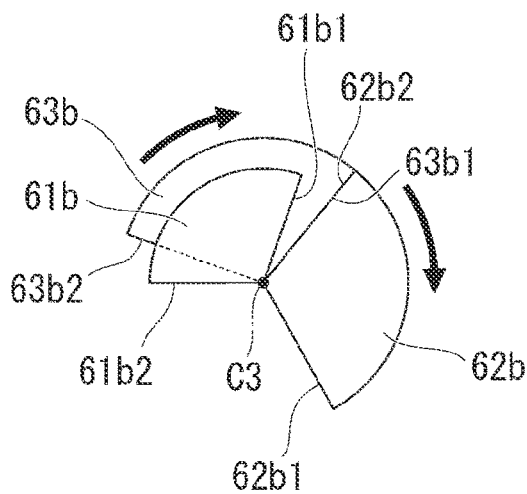
FIG. 9A is a cross-sectional view corresponding to FIG. 8 showing an action of the release shaft in a half clutch region during driving in the clutch actuator.
Figure 9B:
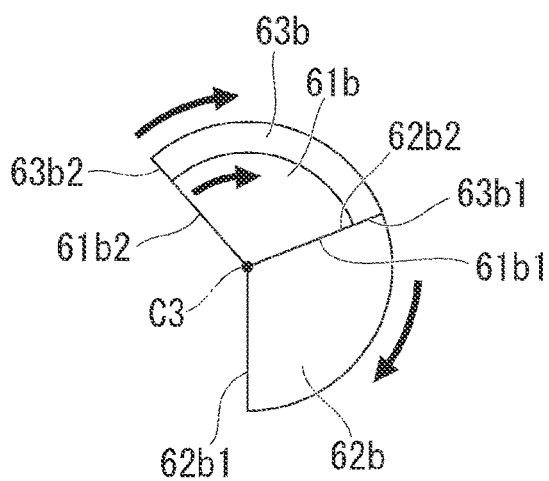
FIG. 9B is a cross-sectional view corresponding to FIG. 8 showing an action of the release shaft in the half clutch region during manual intervention.

Referring also to FIG. 9A, in the half clutch region B, the control operation-side cam 63b presses the clutch-side cam 62b and rotates the lower release shaft 62. When the driven clutch lever torque is increased, the release mechanism 38 lifts the clutch apparatus 26 and reduces the clutch capacity. That is, the clutch apparatus 26 is in a half-clutch state that enables partial power transmission. Reference sign SP in FIG. 12 designates a starting position of an operation (operation starting position) switched from the play region A to the half clutch region B. In the half clutch region B, when the manual operation is intervened, the manual operation-side cam 61b abuts the clutch-side cam 62b. Here, the manual operation-side cam 61b cooperates with the control operation-side cam 63b and rotates the lower release shaft 62 (see FIG. 9B).

Referring to FIG. 12, in the half clutch region B, the driven clutch lever torque sharply increases as the driven clutch lever operating angle increases, actuating the clutch apparatus 26 toward the disconnect side. For example, at the beginning of the half clutch region B, there is an influence of a clutch judder spring reaction force (not shown). Accordingly, at the beginning of the half clutch region B, a speed reduction region B1 is set in which the increase in driven clutch lever torque is gradual with respect to the increase in driven clutch lever operating angle.

In the half clutch region B, the clutch capacity sharply decreases with the increase of the driven clutch lever operating angle, in inverse proportion to the increase of the driven clutch lever torque. In the speed reduction region B1 at the beginning of the half clutch region B, the clutch capacity slows down as the driven clutch lever torque increases slowly.

When the driven clutch lever operating angle passes a touch point TP that is the end point of the half clutch region B, the increase in driven clutch lever torque becomes more gradual than in the speed reduction region B1. A region of the driven clutch lever operating angle after the touch point TP is, for example, a clutch disconnecting region C where the clutch capacity remains equivalent to "0." The clutch disconnecting region C is, for example, an operation margin region for the driven clutch lever 54 or the like to operate up to a mechanical operation limit position. In the clutch disconnecting region C, the driven clutch lever torque is increased slightly. This increment corresponds to the increment of the clutch spring load accompanying the movement of the lift parts of the clutch apparatus 26. Reference sign EP in FIG. 12 indicates a full lift position that is the end point of the clutch disconnecting region C.

For example, a standby position DP is set in an intermediate portion of the clutch disconnecting region C. The following driven clutch lever torque is applied to the standby position DP. The driven clutch lever torque at this time is slightly higher than the torque at the touch point TP where the clutch apparatus 26 starts the connection. At the touch point TP, an operation error may cause some torque transmission. On the other hand, torque transmission of the clutch apparatus 26 is completely disconnected by applying the driven clutch lever torque to the torque at the standby position DP. In addition, by giving a slightly lower driven clutch lever torque to a full lift position EP at the standby position DP, it is possible to make the clutch apparatus 26 ineffective. That is, at the standby position DP, it is possible to cancel the backlash of each part in the clutch apparatus 26 and the reaction force of the operation, etc., and the operation responsiveness when the clutch apparatus 26 is connected can be enhanced.

Further, when the clutch apparatus 26 operates from the connected state to the disconnection side, an operation starting position SP and the touch point TP are determined as follows. That is, the point where the driven clutch lever torque rises (the starting point of the half clutch region B) is the operation starting position SP. In addition, the point where the clutch apparatus 26 is completely disconnected (the end point of the half clutch region B) is the touch point TP.

On the contrary, when the clutch apparatus 26 is operated from the disconnected state to the connection side, the touch point TP and the operation starting position SP are determined as follows. That is, the point where the clutch apparatus 26 starts connecting is the touch point TP. In addition, the point where the clutch apparatus 26 is completely connected is the operation starting position SP.

Figure 13:
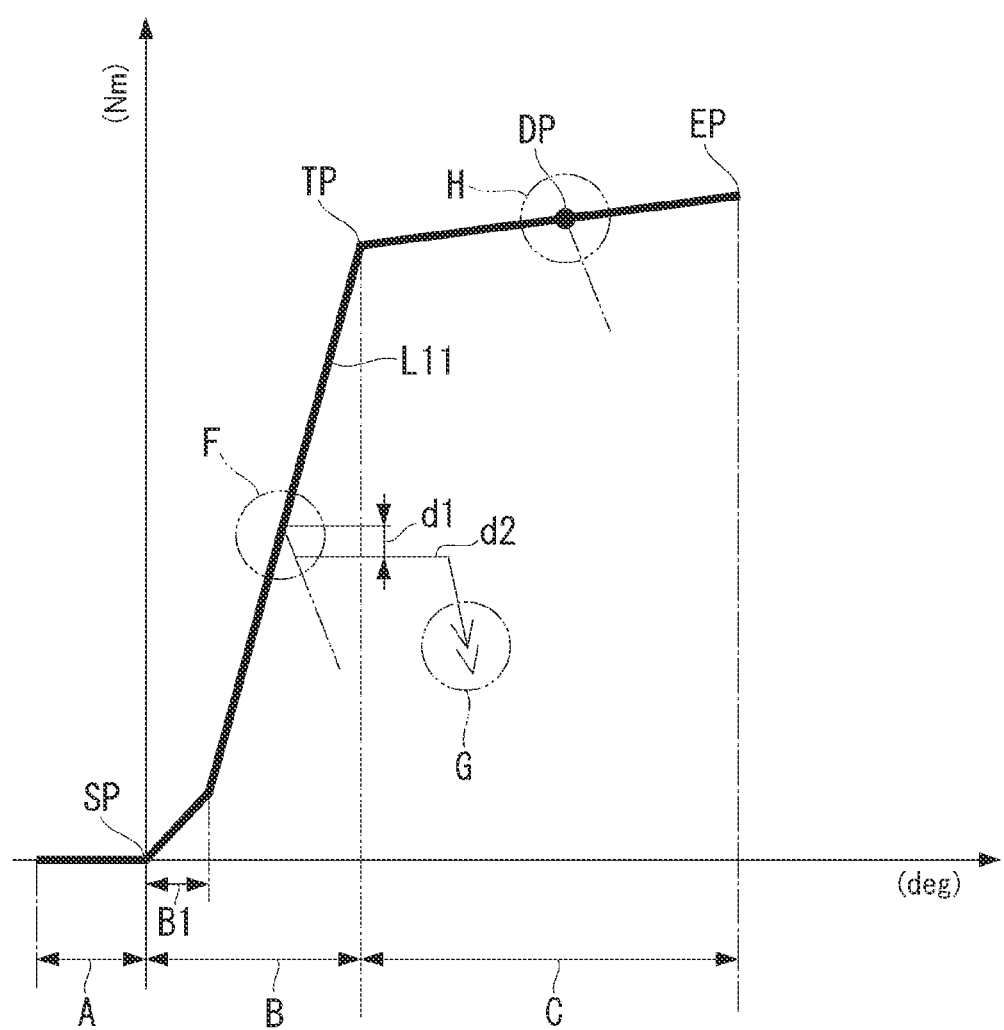
FIG. 13 is a graph corresponding to FIG. 12, showing a first action of the embodiment.

Referring to FIG. 13, in the half clutch region B, driving of the motor 52 is controlled based on the lift load.

In this control, first, based on the resilient force of the clutch spring 37, the clutch spring load is set in advance. Next, according to the driven clutch lever torque, the lift load applied to the clutch apparatus 26 (the operation load against the clutch spring load) is estimated. Then, the load obtained by subtracting the lift load from the clutch spring load is defined as the clutch pressing load that actually acts on the clutch apparatus 26.

The clutch capacity is calculated by "clutch pressing load/clutch spring load." The electric power supplied to the motor 52 is controlled and the driven clutch lever torque and the lift load are controlled such that the clutch capacity becomes the target value. The motor current value and lever operating angle at each of the operation starting position SP and the touch point TP are set to default values in advance. Alternatively, the motor current value and the lever operating angle are set by learning control when the power supply of the motorcycle 1 is on or off, etc., as described later.

An example of the sensing configuration is the following configuration. That is, the current sensor 40b is installed in the motor control device (the ECU 40), and the detected value is converted into a motor torque and further converted into a driven clutch lever torque (clutch operation torque).

As shown in FIG. 13, in the half clutch region B, intervention of the operation (manual operation) of the clutch lever has the following effects. That is, the measured value of the driven clutch lever torque decreases with respect to the correlation line L11 of the preset driven clutch lever torque (see a portion F in the drawings). Here, when the decrement of the driven clutch lever torque exceeds a predetermined threshold d1, it is determined that the manual operation intervention has occurred, and the procedure shifts to the predetermined manual operation intervention control.

In the manual operation intervention control, for example, after the manual operation intervention is detected, the control is performed as follows until the increment of the driven clutch lever operating angle becomes equal to or greater than the predetermined angle. That is, the motor 52 is feedback-controlled so that the driven clutch lever torque maintains a torque d2 after decreasing by the threshold d1. During the current control at this time, after the touch point TP, a current limit is set according to the angle. For this reason, the motor output is substantially 0 in the middle of the current control. Since the load at that time is sufficiently low, it is determined that manual intervention was performed. Accordingly, after the operation of the clutch lever, it is possible to suppress discomfort due to sudden loss of the torque from the motor 52. After the increment of the driven clutch lever operating angle reaches or exceeds the specified angle, the driven clutch lever torque is gradually decreased (see a portion G in the drawings). Accordingly, while suppressing the discomfort, power consumption due to continuous driving of the motor 52 can be suppressed.

In the clutch disconnecting region C, the driving of the motor 52 is controlled based on the lever position (angle).

As described above, in the clutch disconnecting region C, the increase in driven clutch lever torque is small according to the lift of the clutch apparatus 26. For this reason, in the clutch disconnecting region C, the power supplied to the motor 52 is controlled based on the driven clutch lever operating angle. Accordingly, after the touch point TP where the clutch apparatus 26 starts connecting, it becomes possible to more finely control the disconnection amount of the clutch apparatus 26.

As an example of the sensing configuration, the following configuration is exemplified. That is, the first rotation angle sensor 57d and the second rotation angle sensor 58d are provided on the first reduction shaft 57 and the second reduction shaft 58, respectively. Then, the detected value of each of these sensors is converted into the driven clutch lever operating angle (clutch operation angle). The pair of the first rotation angle sensor 57d and the second rotation angle sensor 58d are provided for fail, but only one of them may be provided.

As shown in FIG. 13, in the clutch disconnecting region C, intervention of the operation (manual operation) of the clutch lever has the following effects. That is, the measured value of the driven clutch lever torque decreases with respect to the correlation line L11 of the preset driven clutch lever torque (see a portion H in the drawings).

Figure 10A:
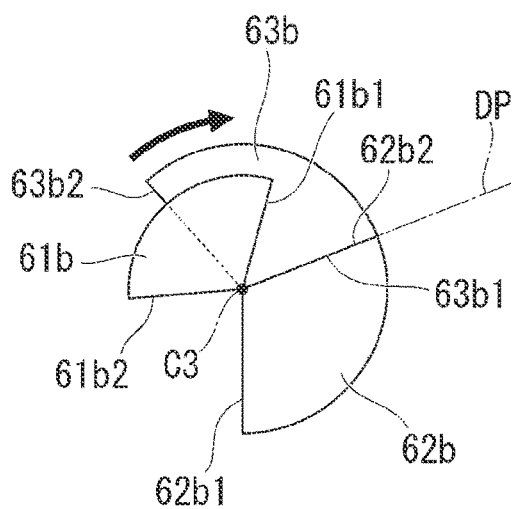
FIG. 10A is a cross-sectional view corresponding to FIG. 8 showing an action of the release shaft at a standby position during driving in the clutch actuator.
Figure 10B:
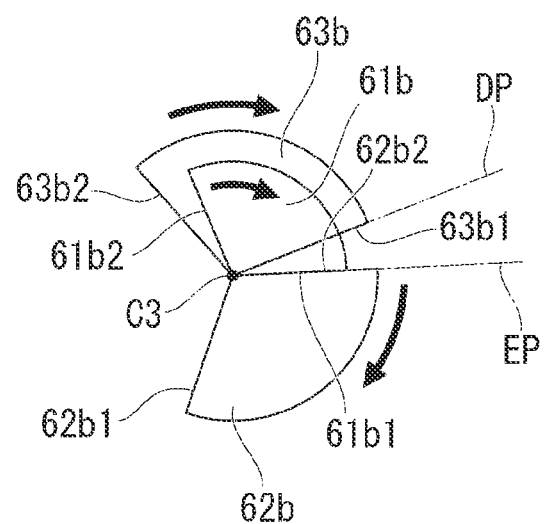
FIG. 10B is a cross-sectional view corresponding to FIG. 8 showing an action of the release shaft at the standby position during manual intervention.

Referring also to FIG. 10A, for example, in the automatic mode M1, the torque applied by the control operation-side cam 63b to the clutch-side cam 62b is limited to the torque up to the standby position DP. The torque from the clutch-side cam 62b beyond the standby position DP to the full lift position EP is applied when the intervention is performed by manually gripping the clutch lever. Here, the torque that exceeds the standby position DP is applied from the manual operation-side cam 61*b* to the clutch-side cam 62*b* (see FIG. 10B). Here, the control operation-side cam 63*b* is separated from the clutch-side cam 62*b*, and the motor output is substantially 0.

Even before reaching the standby position DP, if the driven clutch lever operating angle is in the clutch disconnecting region C beyond the touch point TP, the following effects will occur. That is, through the intervention of the manual operation, the measured value of the driven clutch lever torque becomes substantially 0. Accordingly, in the clutch disconnecting region C, if the measured value of the driven clutch lever torque changes to a range where it is substantially 0, it is determined that the intervention of the manual operation has occurred. Then, the procedure is shifted to the predetermined manual operation intervention control.

In the manual operation intervention control, for example, the control is performed as follows until the increment of the driven clutch lever operating angle becomes equal to or greater than the predetermined angle after the manual operation intervention is detected. That is, the motor output is maintained so that the driven clutch lever operating angle maintains the touch point TP, which is substantially the clutch disconnection position. Accordingly, generation of the engine stall is prevented even if the clutch lever is suddenly released after the manual operation intervention.

In this way, by selectively using the load (current) control and the position (angle) control according to the state of the clutch apparatus 26, finer clutch control (optimal control according to the state or characteristics of the clutch apparatus 26) can be performed.

In the embodiment, the driven clutch lever operating angle (a rotation angle of the gear shaft of the speed reducing mechanism 51) is detected and the control is performed as follows. That is, in the region to the touch point TP that was preset (or learnt) (the half clutch region B), the control was performed with an increased reference of the current value. In the region after the touch point TP (the clutch disconnecting region C), the control was performed with an increased reference of the operating angle.

In addition, in the embodiment, the change of the current value of the motor 52 (converted into the torque value) with respect to the driven clutch lever operating angle is learnt (updated) at the predetermined timing, and the target value is set according to the situation of the clutch apparatus 26. The driving of the motor 52 is feedback-controlled based on the target value and the detected value of the current sensor 40*b* of the ECU 40.

<Compensation of Control Reference Value>

Figure 14:
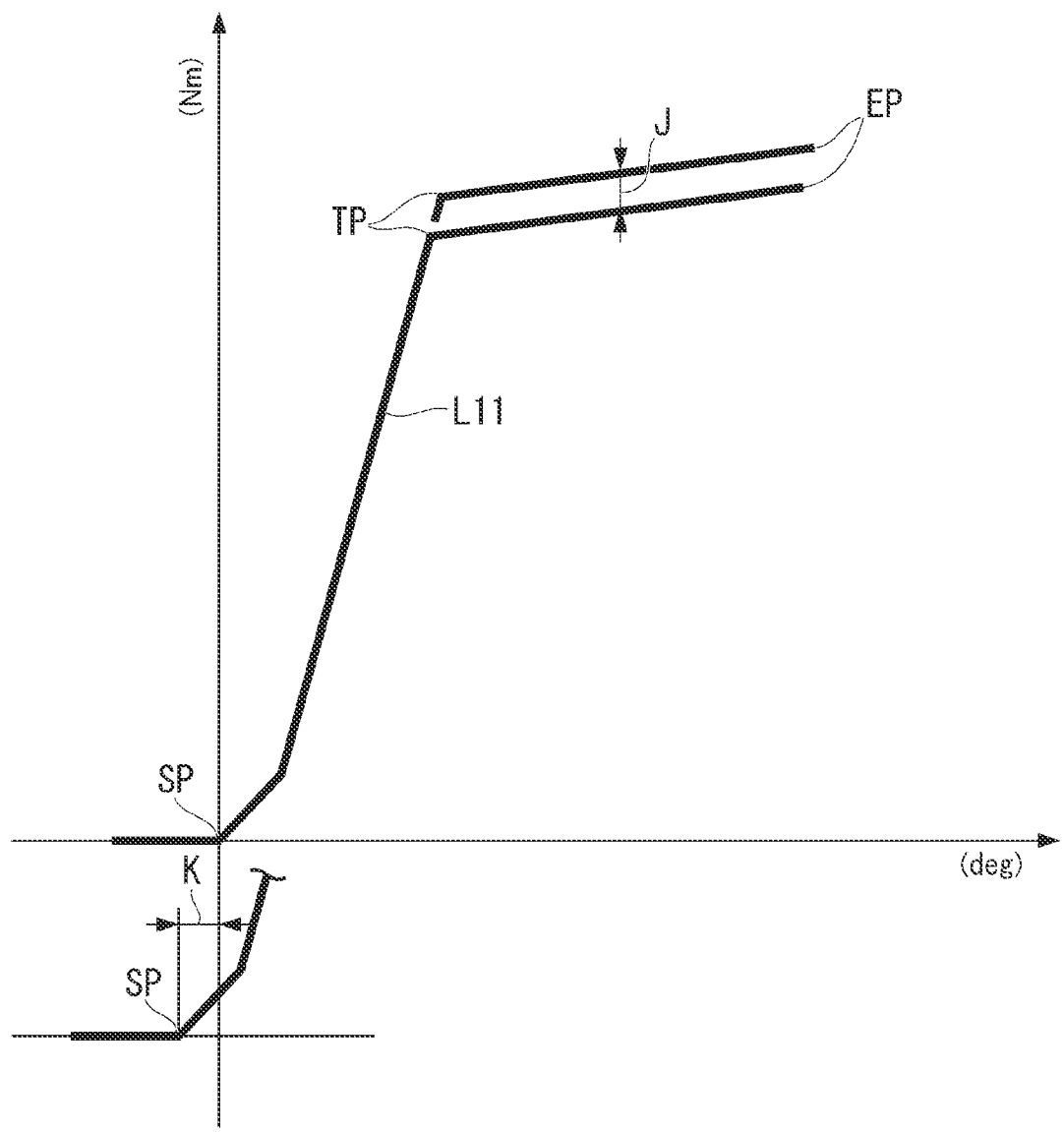
FIG. 14 is a graph corresponding to FIG. 12, showing a second action of the embodiment.

Next, control of learning the current and the angle at the touch point TP or the like of the embodiment will be described with reference to a graph of FIG. 14. The graph of FIG. 14 shows an aspect that the correlation line L11 indicating clutch characteristics shown in FIG. 12 and FIG. 13 is changed according to abrasion of the clutch plates 35 or the temperature (for example, cooling water temperature) of the engine 13. In FIG. 14, a longitudinal axis indicates a driven clutch lever torque (Nm), and a lateral axis indicates a driven clutch lever operating angle (deg).

In the embodiment, for example, when the main switch (power supply) of the motorcycle 1 is turned on or off, 0 point (the operation starting position SP and the touch point TP) during the clutch capacity control is compensated. In the current control of the motor 52, since the temperature change affects the motor torque, the height of the correlation line L11 changes with the temperature (see a portion J in the drawings). Here, for example, 0 point compensation is performed for each of the plurality of temperature ranges, such as whether the engine temperature is equal to or greater than 80 degrees (whether the engine has warmed up or not). The 0 point at this time is stored in a memory and used for the next clutch capacity control.

An example of the procedure for setting (learning) the operation starting position SP and the touch point TP will be described. First, for example, when the power supply of the ECU 40 is turned on or off, the clutch actuator 50 is operated. Here, a change of the current value is measured until the clutch apparatus 26 is disconnected. Next, the inclination of the change (rate of change) of the current value from the play region A to the half clutch region B is detected. In addition, the inclination of the change (rate of change) of the current value from the half clutch region B to the clutch disconnecting region C is detected. The point at which the former inclination is equal to or greater than the threshold is set as the operation starting position SP. The point at which the latter inclination is equal to or smaller than the threshold is the touch point TP.

Alternatively, the following part may be learnt as the operation starting position SP. This part is the part where the current is ramped up from the clutch play region and the speed reduction starts when the angular velocity of the rotation angle sensor accelerates (the part where the maximum speed is reached).

On the contrary, the following part may be learnt as the touch point TP. This part is the part where the current is reduced with a ramp from the clutch disconnection state (held in the region) and the speed reduction starts from where the angular velocity of the rotation angle sensor accelerates (the part where the maximum speed is reached).

In addition, at the same timing as above, it is determined whether or not the driven clutch lever operating angle has decreased by the prescribed value or more. When the driven clutch lever operating angle is greatly reduced, there is a risk of abrasion of the clutch plates 35.

That is, in the normally closed clutch, when the clutch plates 35 are abraded, the lifter shaft 39 moves away from the release mechanism 38. Accordingly, when the clutch plates 35 are abraded, the play of the release mechanism 38 is reduced. Accordingly, the release shaft 53 operates the clutch apparatus 26 to the disconnection side at a small operating angle. Accordingly, at the operation starting position SP where the play region A is switched to the half clutch region B, the driven clutch lever operating angle is decreased (see a portion K in the drawings). Accordingly, when the driven clutch lever operating angle of the operation starting position SP has decreased by the prescribed value or more, it is possible to predict that abrasion of the clutch plates 35 has occurred. When abrasion of the clutch plates 35 is predicted (detected), it is possible to warn the user by using an indicator 40*c* (see FIG. 3) provided in the meter device, etc.

The motor current and the lever operating angle at the touch point TP or the like are learnt each time when the power supply of the motorcycle 1 is turned on or off. Accordingly, the control using the touch point TP or the like can be performed accurately. In addition, abrasion of the clutch plates 35 can also be predicted (detected).

From the relationship between the lever operating angle and the motor current, the motor current and the lever operating angle at the touch point TP where the clutch apparatus 26 starts connection is learnt. Accordingly, it is possible to perform the clutch control based on the influence of friction, abrasion, and temperature.

As described above, the clutch control device according to the embodiment includes the clutch apparatus 26 configured to connect and disconnect power transmission between the engine 13 and the gearbox 21, the clutch actuator 50 configured to output a driving force for actuating the clutch apparatus 26, and the ECU 40 configured to control driving of the clutch actuator 50. The ECU 40 enables intervention of the manual operation by the clutch operator during automatic control of the clutch apparatus 26 by driving the clutch actuator 50, and is shifted to the predetermined manual operation intervention control if there is intervention of the manual operation. The ECU 40 sets the reference output value (line L11) of the clutch actuator 50 in a state in which there is no intervention of the manual operation. When the ECU 40 detects a difference of the predetermined value d1 or more between the reference output value and the measured value of the output value of the clutch actuator 50, it is detected that there has been an intervention of the manual operation.

According to this configuration, in the following cases, the manual operation intervention can be judged to have occurred, and it is possible to be shifted to the manual operation intervention control. Such case is when the current measured value of the output value of the clutch actuator 50 differs from the reference output value of the clutch actuator 50 by a specified value or more. Such reference output value is the output value of the clutch actuator 50 without manual operation intervention. Accordingly, the switching from the automatic clutch control to the manual intervention control can be realized at arbitrary timing by a driver's operation.

In addition, in the clutch control device, when the ECU 40 detects the intervention of the manual operation, the output value of the clutch actuator 50 at the time of this detection is maintained within a predetermined condition.

According to this configuration, during intervention of the manual operation, the driver's discomfort caused by the sudden disappearance of the output value of the clutch actuator 50 can be suppressed. In addition, here, it is possible to be shifted to the manual operation intervention control as appropriate.

In addition, in the clutch control device, when intervention of the manual operation is detected, the ECU 40 maintains the output value of the clutch actuator 50 at the time of this detection until the manual operation amount reaches the predetermined value, and then, gradually reduces the output value.

According to this configuration, during intervention of the manual operation, the driver's discomfort caused by the sudden disappearance of the output value of the clutch actuator 50 can be suppressed. In addition, here, power consumption due to continuous output of the clutch actuator 50 can be suppressed.

In addition, in the clutch control device, when intervention of the manual operation is detected during clutch disconnection by the automatic control, the ECU 40 maintains the clutch disconnection state in the predetermined condition.

According to this configuration, when the manual operation is intervened during clutch disconnection by the automatic control, the following effects are exhibited by maintaining the clutch disconnection state for a predetermined period. That is, it is possible to suppress the influence of the sudden clutch connecting operation after the manual operation.

<Variant of Clutch Actuator>

Figure 18:
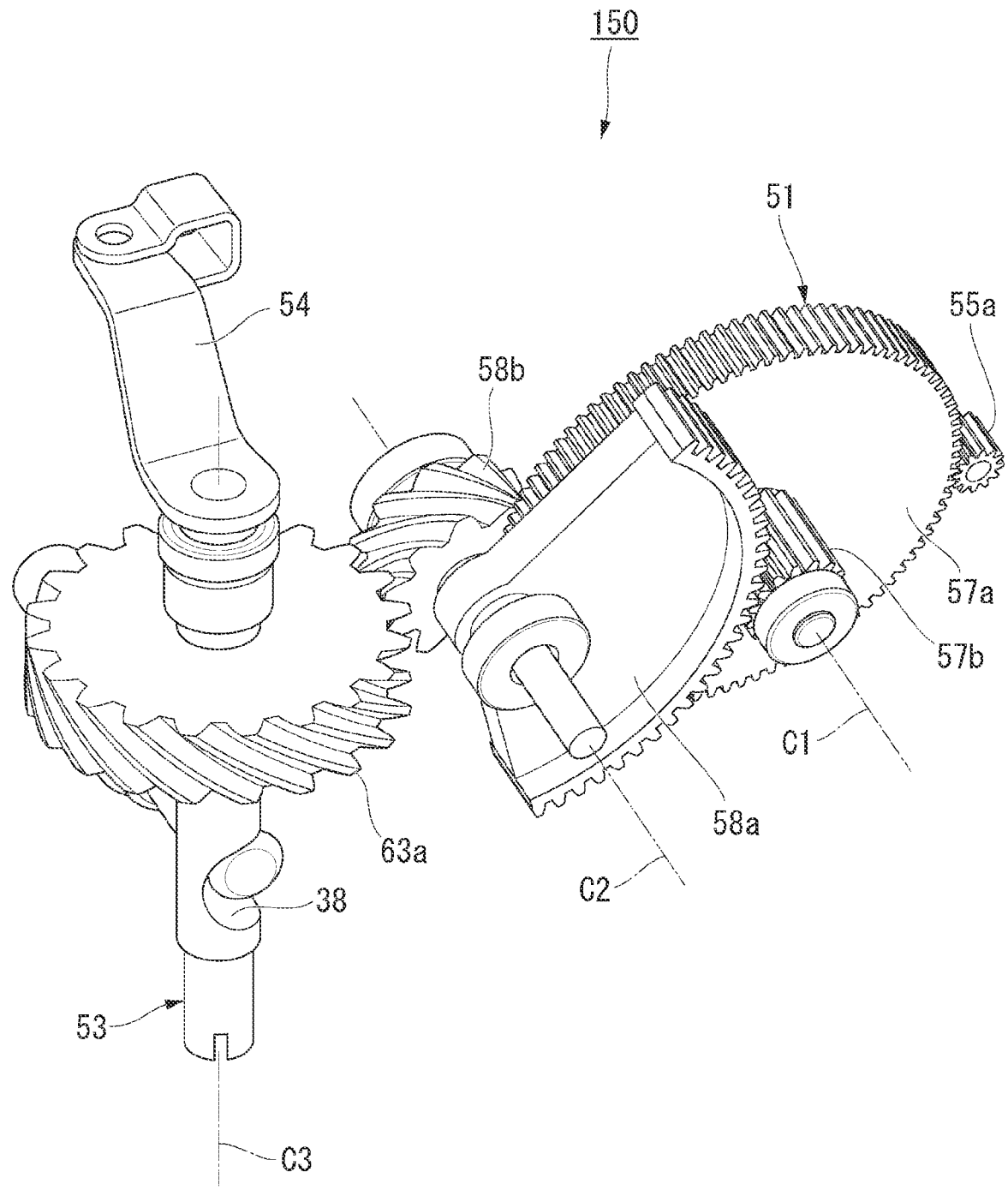
FIG. 18 is a perspective view showing a main part of a clutch actuator of a variant of the embodiment.
Figure 19:
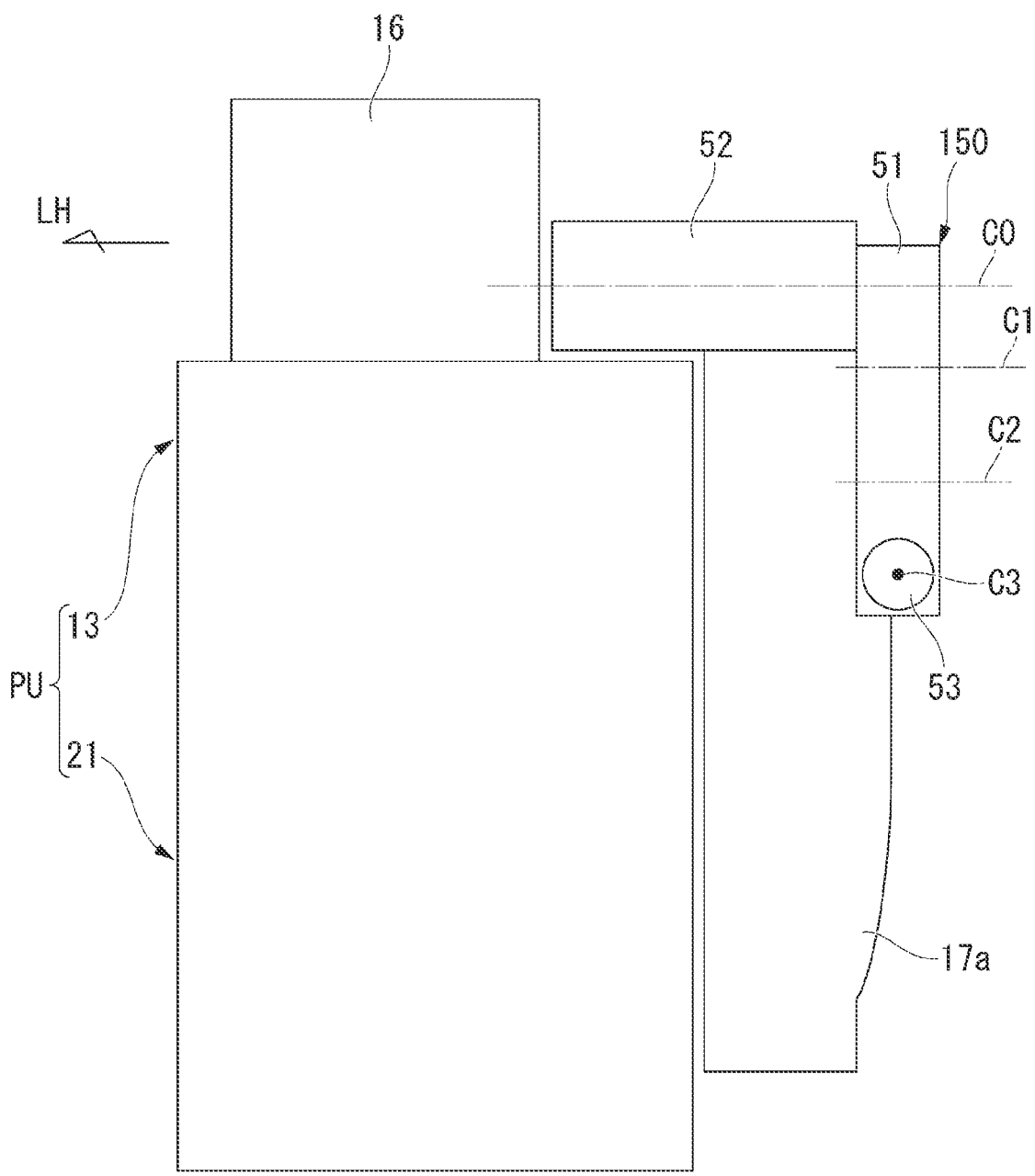
FIG. 19 is a view for describing a state in which the clutch actuator of the variant is mounted in the vehicle.

Here, a variant of the clutch actuator 50 will be described with reference to FIG. 18 and FIG. 19.

The clutch actuator 50 of the embodiment is disposed such that the shafts of the motor 52 and the speed reducing mechanism 51 and the release shaft 53 have axial directions parallel to each other. On the other hand, a clutch actuator 150 of the variant of FIG. 18 and FIG. 19 is disposed such that the shafts of the motor 52 and the speed reducing mechanism 51 and the release shaft 53 have axial directions perpendicular to each other. In the variant, for example, a pair of mutually meshing gears such as the second small diameter gear 58b and the driven gear 63a are constituted by gears (for example, screw gears, bevel gears, etc.) whose axial directions are perpendicular to each other.

In the clutch actuator 150 of the variant, the shafts of the motor 52 and the speed reducing mechanism 51 and the release shaft 53 are disposed with their axial directions perpendicular to each other. In addition, the shafts of the motor 52 and the speed reducing mechanism 51 and the clutch apparatus 26 are disposed with their axial directions parallel to each other. Accordingly, even when a large-diameter reduction gear is provided in the speed reducing mechanism 51 to increase the reduction ratio, while this reduction gear is kept as a simple circular shape, it is possible to suppress overhanging of the speed reducing mechanism 51 to the outside in the vehicle width direction. In addition, the motor 52, which has a large axial dimension, can be arranged so as to protrude in the vehicle width direction of the speed reducing mechanism 51 while avoiding the right cover 17a and the crank case 15. That is, by using the space on the side or rear of the cylinder 16, the disposition space of the motor 52 can be obtained and the clutch actuator 150 can be arranged efficiently.

Accordingly, it is possible to reduce the size of the clutch unit that can be seen in the side view of the vehicle and improve the appearance. In addition, by reducing the volume of the clutch unit that overhangs from the side of the engine 13, it is possible to reduce the influence on the vehicle body bank angle.

Further, the present invention is not limited to the above-mentioned example. For example, the clutch operator is not limited to the clutch lever and may be a clutch pedal or other types of various operators. The clutch apparatus is not limited to being disposed between the engine and the gearbox, but may be disposed between the prime mover and an arbitrary output object other than the gearbox. The prime mover is not limited to the internal combustion engine and may be an electric motor.

The application is not limited to a saddle riding vehicle with an automatic clutch operation like the above-mentioned embodiment. For example, it is also applicable to the saddle riding vehicle that adjusts a driving force and enables gear shifting (a saddle riding vehicle including a so-called clutch operationless gear shifting device) without performing a manual clutch operation under a predetermined condition while still being based on a manual clutch operation.

In addition, the saddle riding vehicle includes all vehicles in which the driver straddles the vehicle body, not only motorcycles (including bicycles with prime movers and scooter type vehicles), but also three-wheeled vehicles (in addition to vehicles with one front wheel and two rear wheels, vehicles with two front wheels and one rear wheel are also included) or vehicles with four wheels are also included, and vehicles that include an electric motor as a prime mover are also included.

Then, the configuration in the above embodiment is an example of the present invention, and various modifications may be made without departing from the scope of the present invention.

REFERENCE SIGNS LIST

1 Motorcycle (saddle riding vehicle)
13 Engine (prime mover)
21 Gearbox (output object)
26 Clutch apparatus
40 ECU (controller)
40A Clutch control device
50, 150 Clutch actuator

What is claim is:

1. A clutch control device comprising:
a clutch apparatus configured to connect and disconnect power transmission between a prime mover and an output object;
a clutch actuator configured to output a driving force for actuating the clutch apparatus;
a controller configured to control driving of the clutch actuator; and
a clutch operator configured to operate the clutch apparatus regardless of the driving of the clutch actuator,
wherein the controller detects that there is a manual operation by the clutch operator when a difference of a predetermined value or more is detected between a reference output value of the clutch actuator configured to operate the clutch apparatus and a measured value of an output value of the clutch actuator.

2. The clutch control device according to claim 1, wherein the controller is shifted to predetermined manual operation intervention control when existence of the manual operation is detected.

3. The clutch control device according to claim 1, wherein, when intervention of the manual operation is detected, the controller maintains an output value of the clutch actuator upon the detection within a predetermined condition.

4. The clutch control device according to claim 3, wherein, when the intervention of the manual operation is detected, the controller maintains the output value of the clutch actuator upon the detection until a manual operation amount reaches a predetermined value and then gradually reduces the output value.

5. The clutch control device according to claim 1, wherein the controller maintains a clutch disconnection state within a predetermined condition when intervention of the manual operation is detected upon clutch disconnection by automatic control.

* * * * *